US008542312B2

(12) United States Patent
Nakagome et al.

(10) Patent No.: US 8,542,312 B2
(45) Date of Patent: Sep. 24, 2013

(54) DEVICE HAVING IMAGE RECONSTRUCTING FUNCTION, METHOD, AND STORAGE MEDIUM

(75) Inventors: Kouichi Nakagome, Tokorozawa (JP); Tomoaki Nagasaka, Koganei (JP)

(73) Assignee: Casio Computer Co., Ltd., Tokyo (JP)

( * ) Notice: Subject to any disclaimer, the term of this patent is extended or adjusted under 35 U.S.C. 154(b) by 22 days.

(21) Appl. No.: 13/434,024

(22) Filed: Mar. 29, 2012

(65) Prior Publication Data

US 2012/0249823 A1 Oct. 4, 2012

(30) Foreign Application Priority Data

Mar. 31, 2011 (JP) .................................. 2011-080746

(51) Int. Cl.
*H04N 5/225* (2006.01)
(52) U.S. Cl.
USPC ............... 348/340; 359/619; 348/42; 348/50; 382/154
(58) Field of Classification Search
None
See application file for complete search history.

(56) References Cited

U.S. PATENT DOCUMENTS

| | | | |
|---|---|---|---|
| 6,351,269 B1 | 2/2002 | Georgiev | |
| 7,620,309 B2 | 11/2009 | Georgiev | |
| 7,723,662 B2 * | 5/2010 | Levoy et al. | 250/208.1 |
| 7,732,744 B2 | 6/2010 | Utagawa | |
| 8,290,358 B1 * | 10/2012 | Georgiev | 396/326 |
| 2005/0123190 A1 * | 6/2005 | Zhang et al. | 382/154 |
| 2006/0066612 A1 * | 3/2006 | Yang et al. | 345/419 |
| 2009/0041381 A1 * | 2/2009 | Georgiev et al. | 382/280 |
| 2010/0020178 A1 * | 1/2010 | Kleihorst | 348/175 |
| 2012/0050562 A1 * | 3/2012 | Perwass et al. | 348/222.1 |
| 2012/0147152 A1 * | 6/2012 | Vogiatis et al. | 348/50 |
| 2012/0242855 A1 * | 9/2012 | Nagasaka et al. | 348/222.1 |
| 2012/0281072 A1 * | 11/2012 | Georgiev et al. | 348/49 |
| 2013/0064453 A1 * | 3/2013 | Nagasaka et al. | 382/190 |

FOREIGN PATENT DOCUMENTS

| | | |
|---|---|---|
| JP | 2007-004471 A | 1/2007 |
| JP | 2008-304331 A | 12/2008 |
| JP | 2009-165115 A | 7/2009 |

(Continued)

OTHER PUBLICATIONS

Decision to Grant dated Dec. 4, 2012 issued in counterpart Japanese Application No. 2011-080746.

(Continued)

*Primary Examiner* — Luong T Nguyen
*Assistant Examiner* — Wesley J Chiu
(74) *Attorney, Agent, or Firm* — Holtz, Holtz, Goodman & Chick, PC

(57) ABSTRACT

A reconstructed image with less noise is reconstructed from a lens array image. An image reconstructing device acquires the lens array image formed by a lens array comprising an array of multiple sub-lenses for an optical image of an object formed by a main lens. The image reconstructing device comprises an interpolation part interpolating a third sub-image formed by a third sub-lens based on the first sub-image and the second sub-image constituting the acquired lens array image, wherein the third sub-lens is positioned between the first sub-lens forming the first sub-image and the second sub-lens forming the second sub-image. The image reconstructing device comprises a reconstructing part reconstructing an image of the object formed by the main lens focused on a point at a given distance from the interpolated third sub-image, the first sub-image and the second sub-image.

11 Claims, 23 Drawing Sheets

(56) References Cited

FOREIGN PATENT DOCUMENTS

| | | | |
|---|---|---|---|
| JP | 2009165115 A | * | 7/2009 |
| JP | 2009-532993 A | | 9/2009 |
| WO | WO2007/115281 A | | 10/2007 |

OTHER PUBLICATIONS

Japanese Office Action dated Aug. 7, 2012 and English translation thereof in counterpart Japanese Application No. 2011-080746.

* cited by examiner

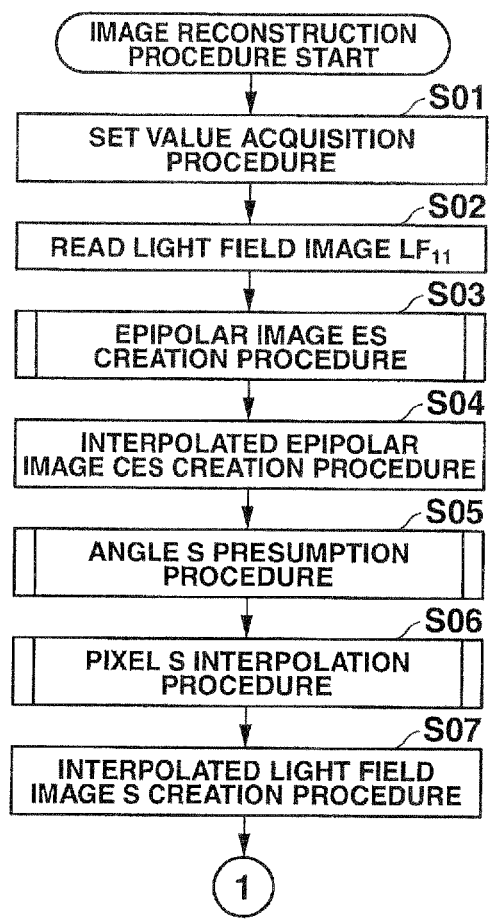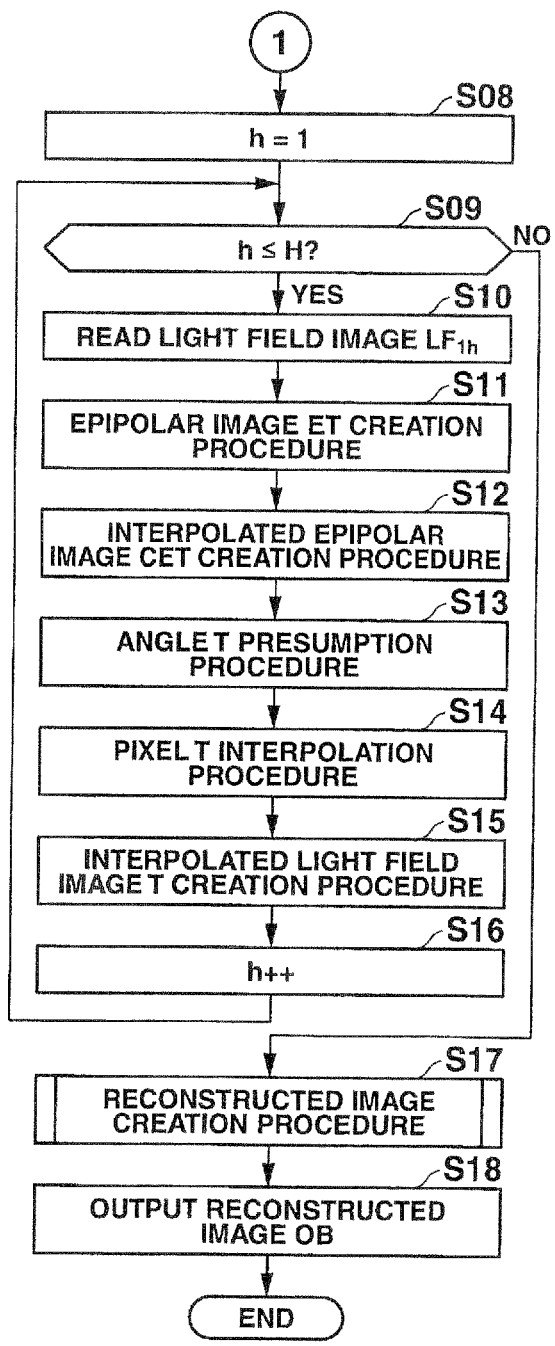
FIG.4A / FIG.4B

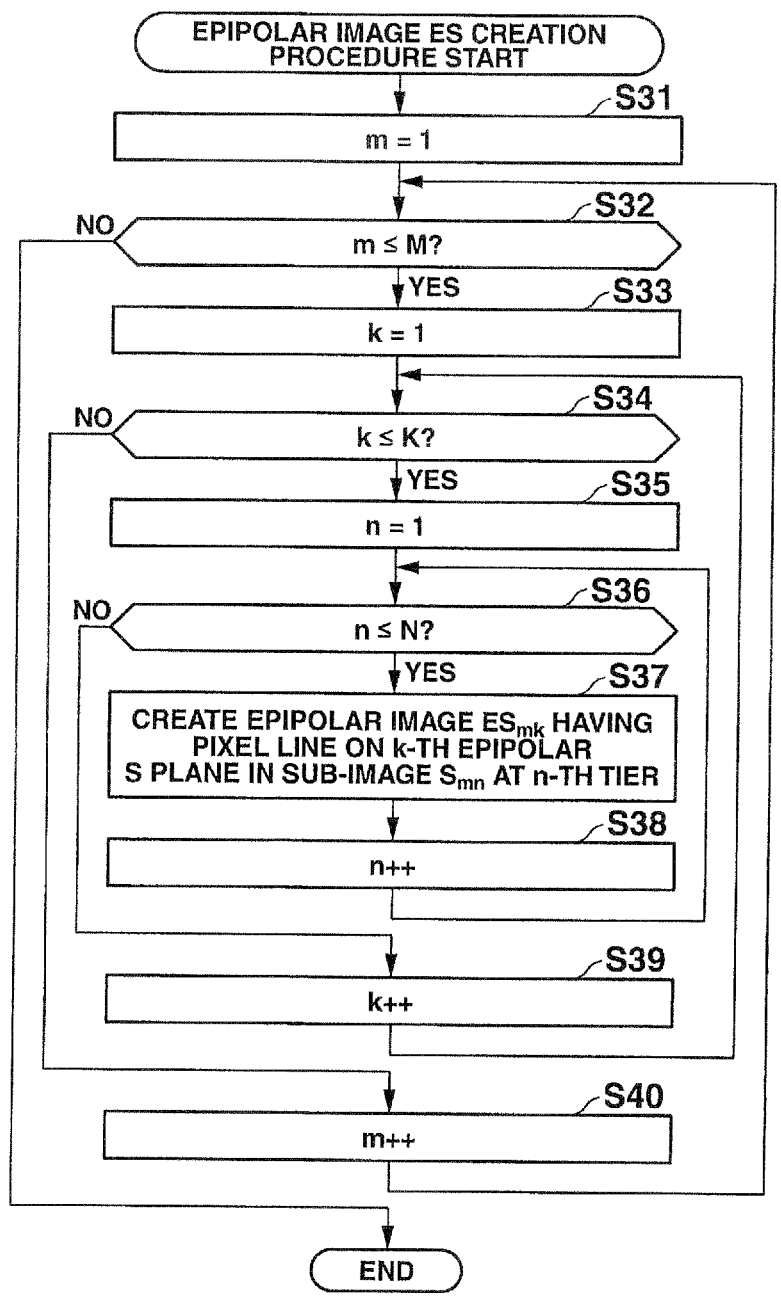

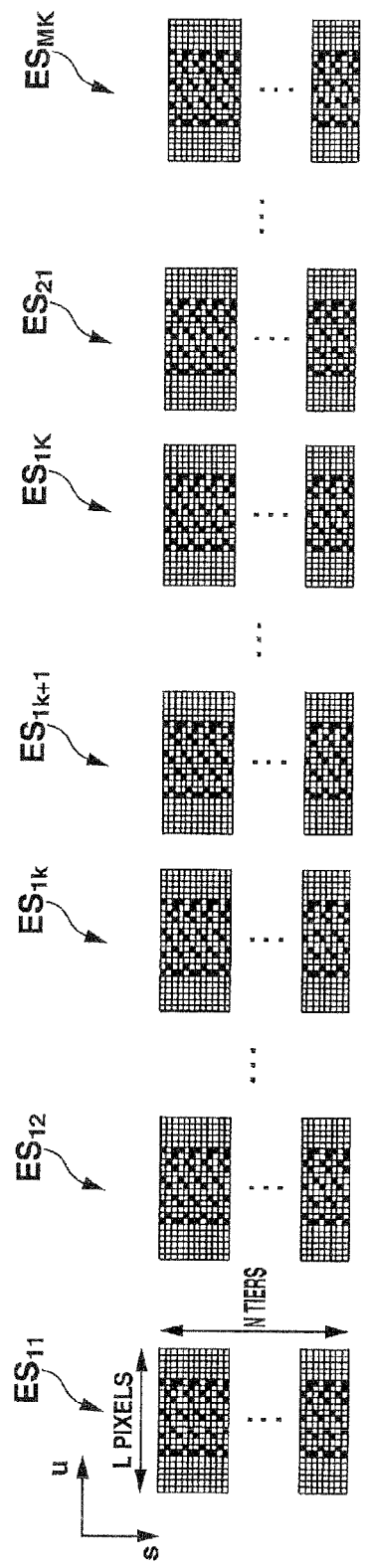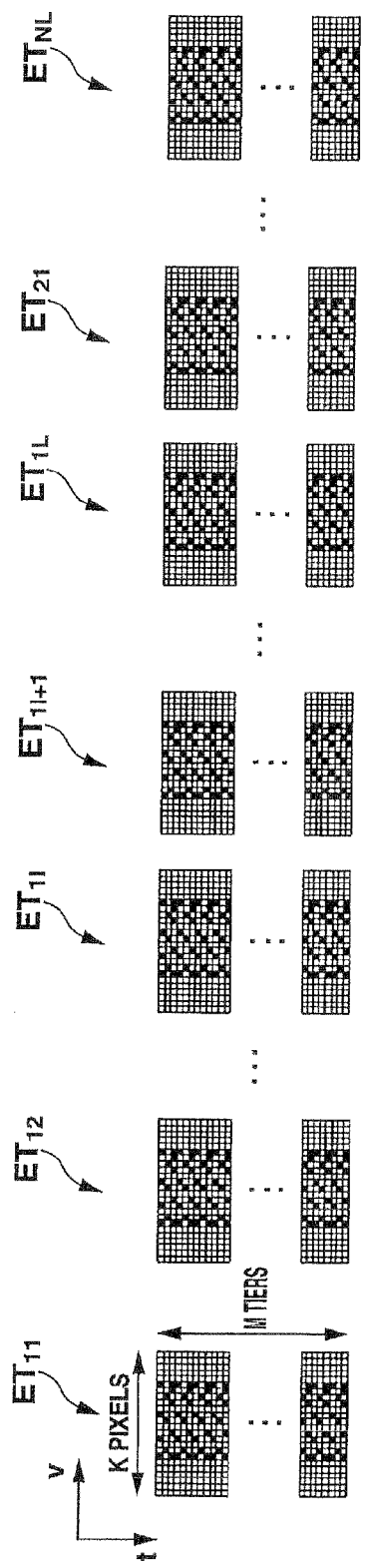

FIG.15

PRESUMED ANGLE S TABLE

| INTERPOLATED EPIPOLAR IMAGE ID | | PIXEL ID | | PRESUMED ANGLE |
|---|---|---|---|---|
| m | k | n | l | |
| 1 | 1 | 1 | 1 | 0.785 |
| 1 | 1 | 1 | 2 | 0.685 |
| ⋮ | ⋮ | ⋮ | ⋮ | ⋮ |
| 1 | 1 | 1 | L | UNKNOWN |
| 1 | 1 | 2 | 1 | 0.780 |
| ⋮ | ⋮ | ⋮ | ⋮ | ⋮ |
| 1 | 1 | N | L | 0.701 |
| 1 | 2 | 1 | 1 | UNKNOWN |
| ⋮ | ⋮ | ⋮ | ⋮ | ⋮ |
| 1 | K | N | L | 0.885 |
| 2 | 1 | 1 | 1 | 0.875 |
| ⋮ | ⋮ | ⋮ | ⋮ | ⋮ |
| M | K | N | L | 0.550 |

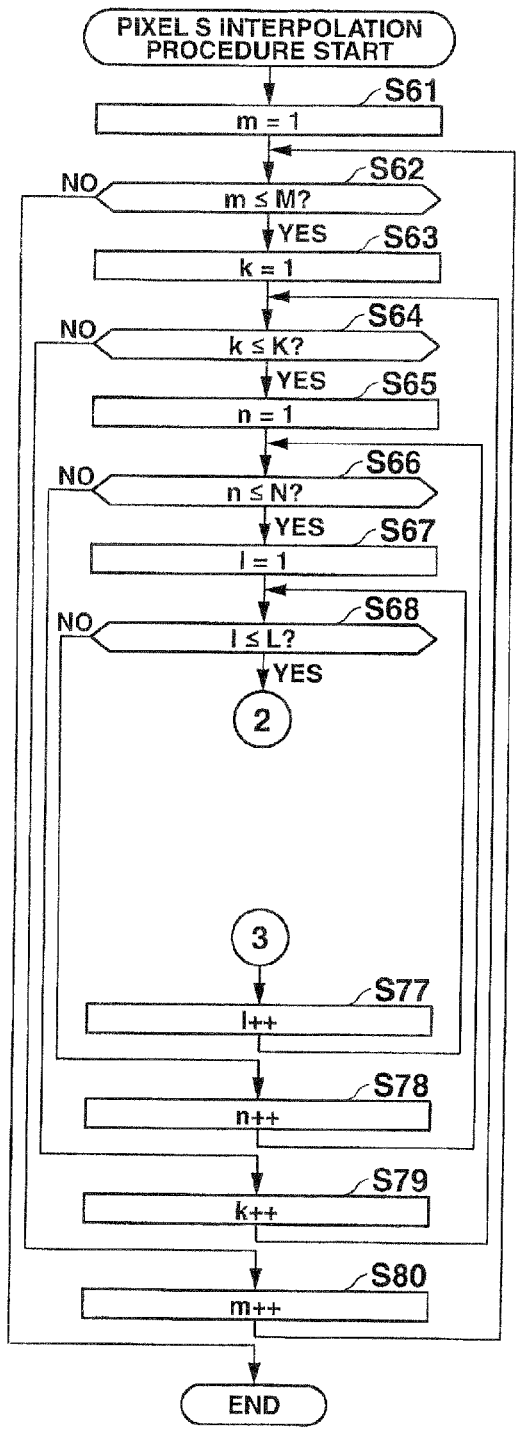
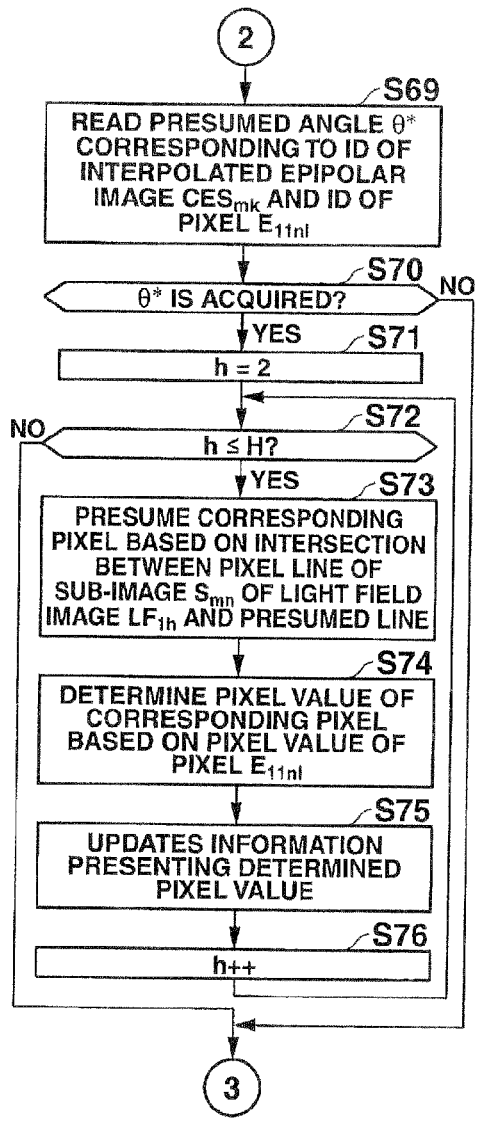

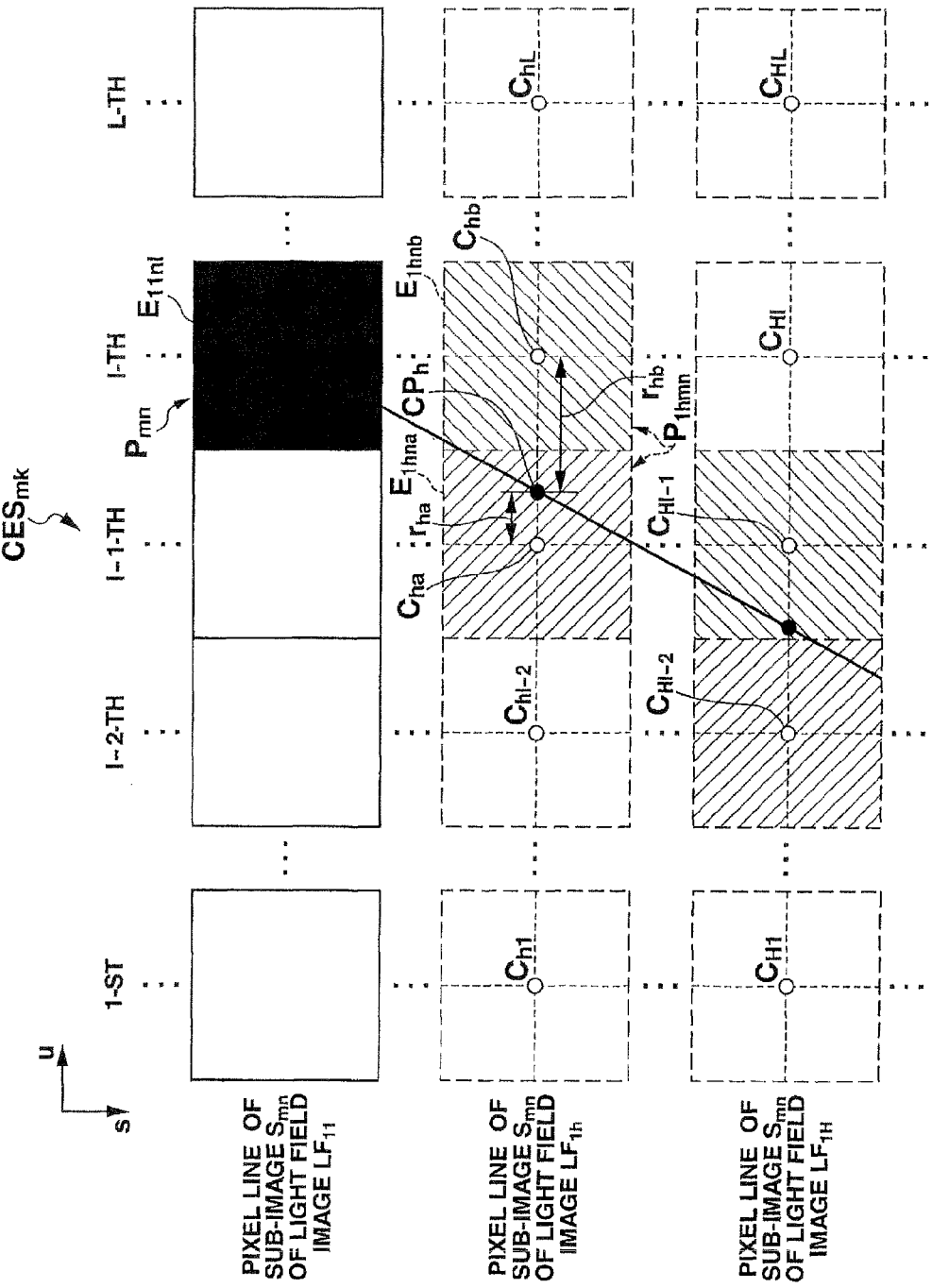

FIG.18

INTERPOLATED LIGHT FILED IMAGE LF$_{1h}$
INTERPOLATED PIXEL TABLE

| INTERPOLATED EPIPOLAR IMAGE ID | | PIXEL ID | | PIXEL VALUE |
|---|---|---|---|---|
| m | k | n | l | |
| 1 | 1 | 1 | 1 | 255, 0, 0 |
| 1 | 1 | 1 | 2 | 255, 0, 0 |
| ... | ... | ... | ... | ... |
| 1 | 1 | 1 | L | 128, 0, 0 |
| 1 | 1 | 2 | 1 | 0, 128, 0 |
| ... | ... | ... | ... | ... |
| 1 | 1 | N | L | 0, 128, 0 |
| 1 | 2 | 1 | 1 | 0, 0, 0 |
| ... | ... | ... | ... | ... |
| 1 | K | N | L | 0, 0, 0 |
| 2 | 1 | 1 | 1 | 64, 64, 64 |
| ... | ... | ... | ... | ... |
| M | K | N | L | 64, 0, 0 |

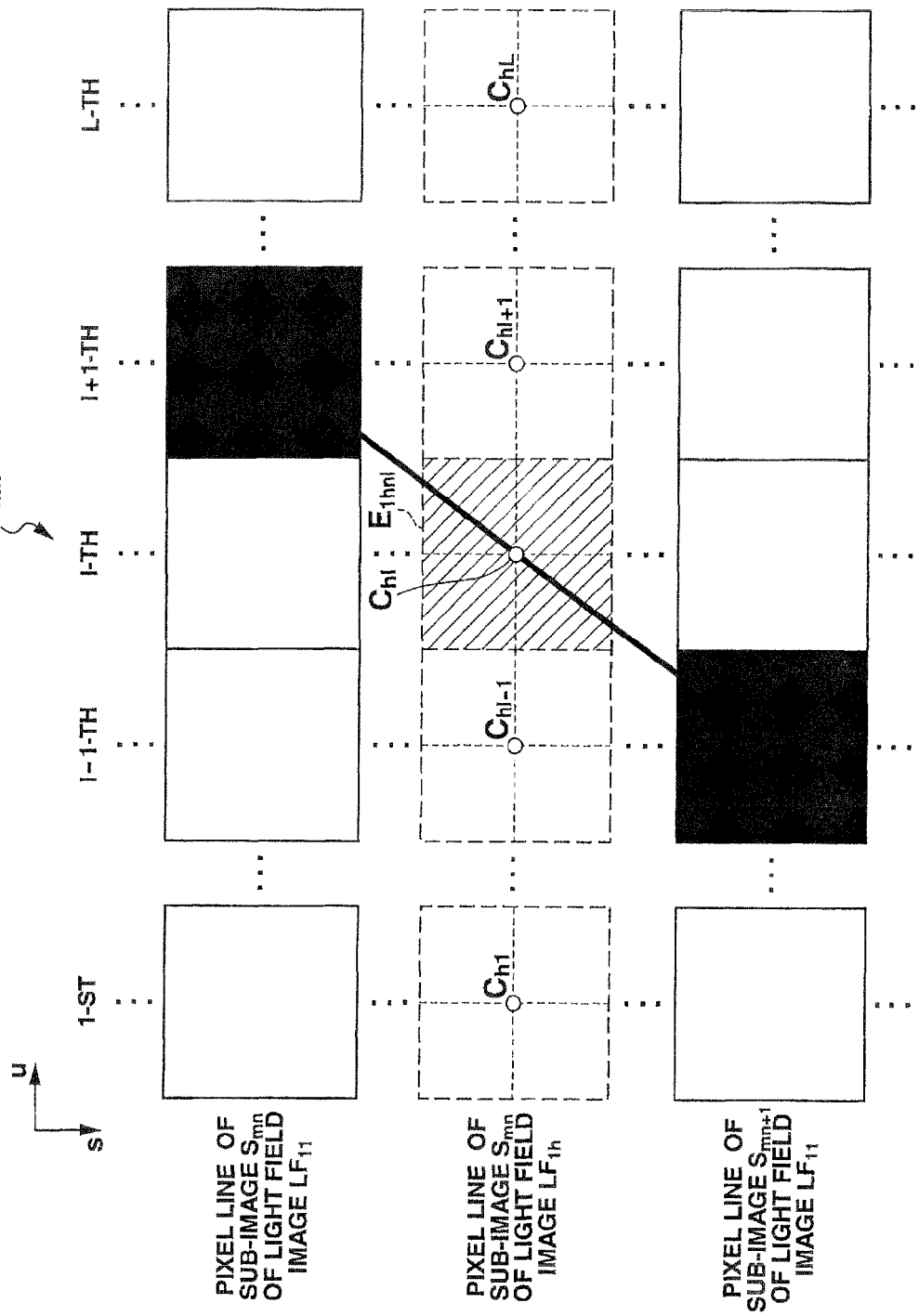

DEVICE HAVING IMAGE RECONSTRUCTING FUNCTION, METHOD, AND STORAGE MEDIUM

CROSS-REFERENCE TO RELATED APPLICATION

This application claims the benefit of Japanese Patent Application No. 2011-080746, filed on Mar. 31, 2011, the entire disclosure of which is incorporated by reference herein.

FIELD

This application relates to an image-reconstructing technique.

BACKGROUND

Cameras capturing an image (hereinafter referred to as a lens array image) formed by an array of multiple microlenses (a microlens array, hereafter) $LA_{11}$ from an image of an object formed by a main lens LM as shown in FIG. 22 are known.

Furthermore, a technique for reconstructing, from a lens array image, an object image OB formed by the main lens LM with the main lens LM focused (namely, post-focused) on a surface at a given distance is known.

In the above technique, provided that light is emitted from a pixel constituting an image to be reconstructed (a reconstructed image, hereafter) OB, multiple destination points on an imaging element surface IE where the light falls on are identified and the pixel values of the lens array image corresponding to the imaging elements at the identified multiple destination points are integrated to identify the pixel values of the reconstructed image OB.

Here, images formed by a microlens array $LA_{11}$ have parallax corresponding to the lens pitch 2dr of the microlenses and/or the like. This parallax causes some pixels necessary for reconstructing an image OB to be missing from a lens array image (namely, missing pixels occur). Then, a problem is that the reconstructed image OB has noise appearing as periodic change in brightness of the image as shown in a part Nz of FIG. 23.

SUMMARY

The image reconstructing device according to a first exemplary aspect of the present invention comprises:

an image information acquiring section that acquires information forming a lens array image, the lens array image is formed by a lens array comprising an array of sub-lenses including a first sub-lens and a second sub-lens for an optical image of an object formed by a main lens;

an interpolating section that interpolates a third sub-image formed by a third sub-lens based on a first sub-image and a second sub-image constituting the lens array image, wherein the third sub-lens is positioned between the first sub-lens forming the first sub-image and the second sub-lens forming the second sub-image;

a distance information acquiring section that acquires distance information indicating a distance to a point on which the main lens focuses;

a reconstructing section that reconstructs an image of the object formed by the main lens focused on the point at the distance indicated by the acquired distance information from the interpolated third sub-image, the first sub-image and the second sub-image; and an image information outputting section that outputs information forming the reconstructed image.

The image reconstructing method according to a second exemplary aspect of the present invention includes the steps of:

acquiring information forming a lens array image, the lens array image is formed by a lens array comprising an array of sub-lenses including a first sub-lens and a second sub-lens for an optical image of an object formed by a main lens;

interpolating a third sub-image formed by a third sub-lens based on a first sub-image and a second sub-image constituting the lens array image, wherein the third sub-lens is positioned between the first sub-lens forming the first sub-image and the second sub-lens forming the second sub-image;

acquiring distance information indicating a distance to a point on which the main lens focuses;

reconstructing an image of the object formed by the main lens focused on the point at the distance indicated by the acquired distance information from the interpolated third sub-image, the first sub-image and the second sub-image; and outputting information forming the reconstructed image.

The non-transitory computer-readable storage medium according to a third exemplary aspect of the present invention stores a program executable by a computer, causing the computer to realize functions of:

acquiring information forming a lens array image, the lens array image is formed by a lens array comprising an array of sub-lenses including a first sub-lens and a second sub-lens for an optical image of an object formed by a main lens;

interpolating a third sub-image formed by a third sub-lens based on a first sub-image and a second sub-image constituting the lens array image, wherein the third sub-lens is positioned between the first sub-lens forming the first sub-image and the second sub-lens forming the second sub-image;

acquiring distance information indicating a distance to a point on which the main lens focuses;

reconstructing an image of the object formed by the main lens focused on the point at the distance indicated by the acquired distance information from the interpolated third sub-image, the first sub-image and the second sub-image; and outputting information forming the reconstructed image.

BRIEF DESCRIPTION OF THE DRAWINGS

A more complete understanding of this application can be obtained when the following detailed description is considered in conjunction with the following drawings, in which:

FIGS. 4A and 4B are flowcharts presenting an image reconstruction procedure;

FIG. 7 is a flowchart presenting an epipolar image ES creation procedure;

FIG. 8A is an illustration presenting an epipolar image ES;

FIG. 8B is an illustration presenting an epipolar image ET;

FIG. 15 is an illustration presenting a presumed angle S table;

FIGS. 16A and 16B are flowcharts presenting a pixel S interpolation procedure;

FIG. 17 is an illustration for explaining a line presumption method;

FIG. 18 is an illustration presenting an interpolated pixel table;

FIG. 21 is an illustration for explaining another line presumption method;

DETAILED DESCRIPTION

A device having an image reconstructing function (an image reconstructing device, hereafter) 210 according to an embodiment of the present invention will be described hereafter with reference to the attached drawings.

Figure 1A:
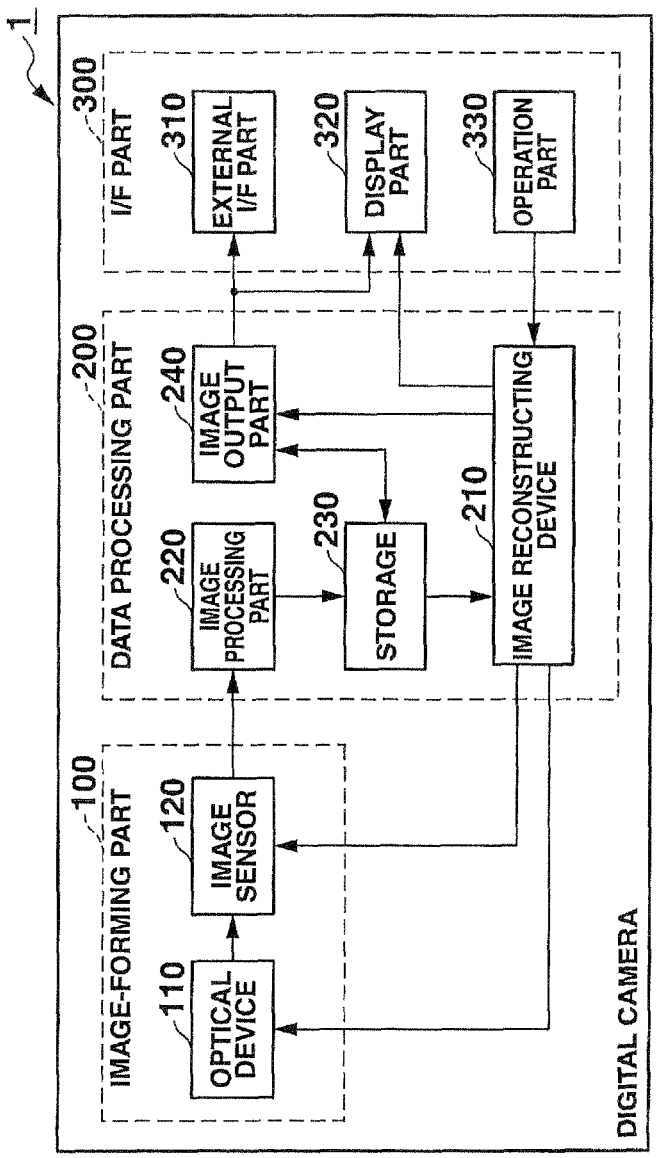
FIGS. 1A and 1B are diagrams presenting a digital camera in which the image reconstructing device is installed.

The image reconstructing device 210 according to an embodiment of the present invention is installed in a digital camera 1 as shown in FIG. 1A. The image reconstructing device 210 reconstructs an image in focus at any distance from an image captured by the digital camera 1.

The digital camera 1 comprises an imaging part 100, a data processing part 200 including the image reconstructing device 210 according to the present invention, and an interface part (an OF part in the FIG. 300.

Figure 22:
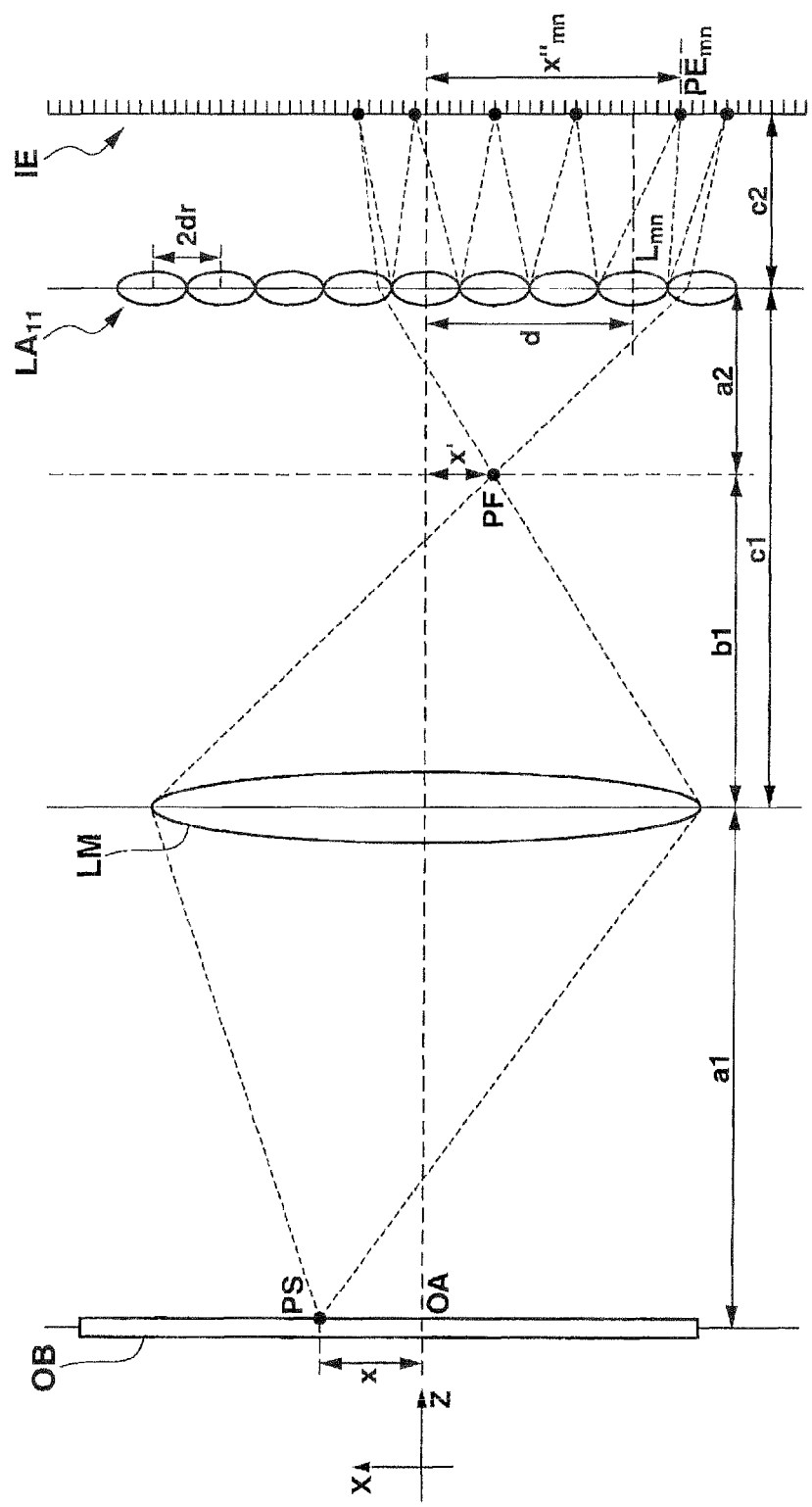
FIG. 22 is an illustration presenting an optical device of a digital camera.
Figure 23:
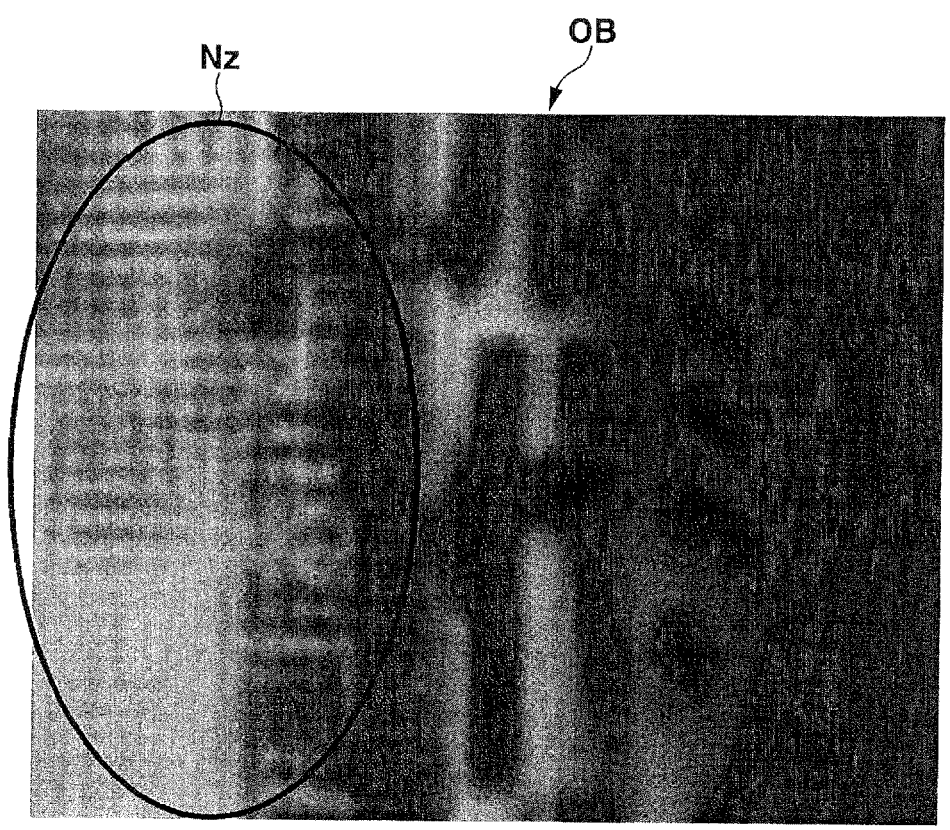
FIG. 23 is a photographic image presenting noise appearing in a reconstructed image.

The imaging part 100 conducts imaging operation of the digital camera 1 and comprises an optical device 110 and an image sensor 120. The optical device 110 includes a main lens LM and a lens array $LA_{11}$ forming an image of an optical image formed by the main lens LM as shown in FIG. 22 and a not-shown diaphragm mechanism and shutter mechanism, and conducts optical operation regarding image formation.

Figure 2:
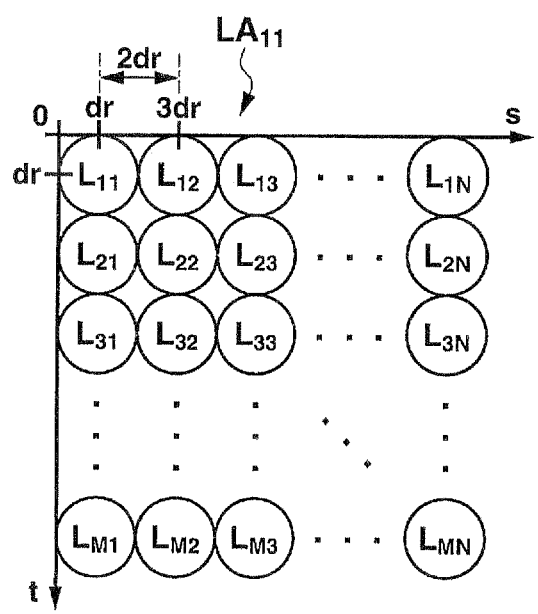
FIG. 2 is an illustration presenting a lens array of a digital camera.

The lens array $LA_{11}$ consists of sub-lenses (microlenses, hereafter) $L_{11}$ to $L_{MN}$ as shown in FIG. 2 arranged in the number of M at a vertical pitch of 2dr (namely, in the subscan direction) and in the number of N at a horizontal pitch of 2dr (namely, in the main scan direction).

The image sensor 120 comprises an imaging element such as a CCD (charge coupled device) and CMOS (complementary metal oxide semiconductor). The image sensor 120 generates electric signals according to incident light collected by the lens array $LA_{11}$ of the optical device 110 and outputs the generated electric signals to the data processing part 200.

Figure 3:
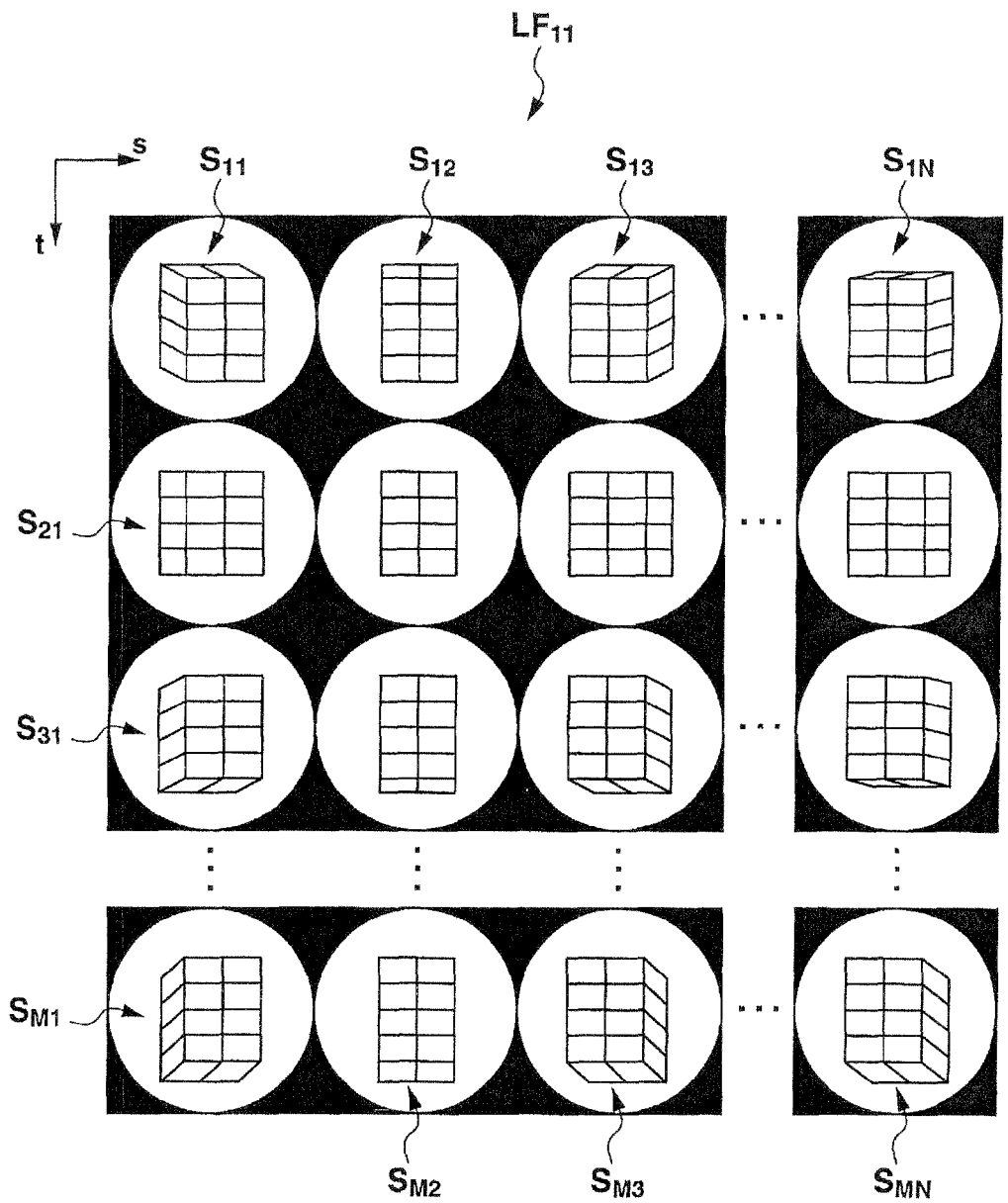
FIG. 3 is an illustration presenting a light field image.

The data processing part 200 conducts signal-processing on analogue electric signals generated by the imaging part 100 to create digital data (namely, image data) forming a lens array image (also termed a light field image, hereafter) $LF_{11}$ as shown in FIG. 3 formed by the lens array $LA_{11}$, and conducts various image-processing on the created image.

Figure 1B:
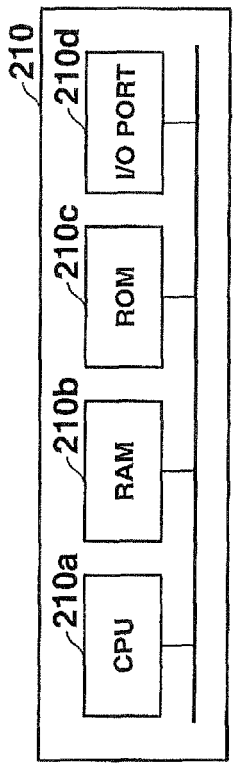

The data processing part 200 comprises an image reconstructing device 210, an image processing part 220, a storage 230, and an image output part 240. The image reconstructing device 210 comprises, for example, an LSI (large scale integration) comprising a CPU (central processing unit) 210a, a RAM (random access memory) 210b, a ROM (read only memory) 210c, and an I/O port 210d as shown in FIG. 1B.

The CPU 210a executes software processing according to programs stored in the ROM 210c to control the parts of the digital camera 1 including the image reconstructing device 210 (namely, the total control). The RAM 210b temporarily stores information (data) to process while the CPU 210a executes programs. The I/O port 210d inputs/outputs data between the parts connected to the image reconstructing device 210 and the CPU 210a.

The image processing part 220 comprises, for example, a buffer memory, an AD (analog/digital) converter, and a processor for image processing. The AD converter of the image processing part 220 converts analog electric signals output from the image sensor 120 to digital signals. Then, the processor of the image processing part 220 conducts so-called development process to create image data, for example, JPEG (joint photographic experts group) and bitmap data, and stores the created image data in the storage 230.

The storage 230 comprises a storage device, for example, a DRAM (dynamic random access memory) and flash memory, storing image data created by the image processing part 220 and image data created by the image reconstructing device 210.

The image output part 240 comprises, for example, a liquid crystal display controller or RGB signal generation circuit, converting image data output from the image reconstructing device 210 and/or image data stored in the storage 230 to RGB signals and/or the like and outputting the RGB signals to a display part 320 described later.

The interface part 300 serves as interface between the digital camera 1 and its user or an external device and comprises an external interface part 310, a display part 320, and an operation part 330.

The external interface part 310 comprises, for example, a USB (universal serial bus) connector and/or video output terminal, serving in output of image data to an external computer device, output of display of an image to an external monitor device, uploading of programs from a recording medium, reading of image data, writing of image data on a recording medium, and the like.

The display part 320 comprises, for example, a liquid crystal display device and/or organic EL (electroluminescence) display. The display part 320 displays various screens necessary for operating the digital camera 1 and various images based on image signals (RGB signals) from the image output part 240.

The operation part 330 comprises various buttons provided on the exterior of the digital camera 1 and/or the like, generating operation signals in accordance with operation by the user of the digital camera 1 and entering the generated operation signals into the image reconstructing device 210.

Figure 5A:
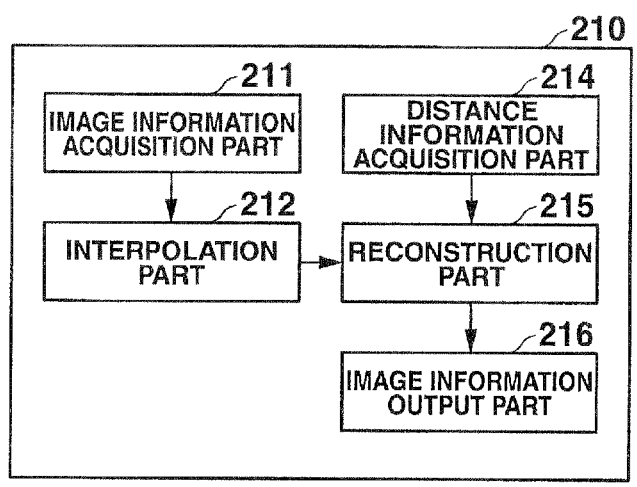
FIG. 5A is a diagram presenting functions of an image reconstructing device.
Figure 5B:
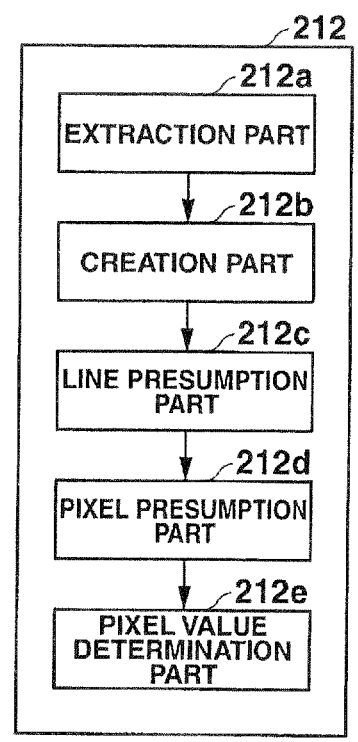
FIG. 5B is a diagram presenting functions of an interpolation part.

Executing an image reconstruction procedure as shown in FIGS. 4A and 4B, the CPU 210a of the image reconstructing device 210 functions as an image information acquisition part 211, an interpolation part 212, a distance information acquisition part 214, a reconstruction part 215, and an image information output part 216 as shown in FIG. 5A. Here, the interpolation part 212 in FIG. 5A has an extraction part 212a, a creation part 212b, a line presumption part 212c, a pixel presumption part 212d, and a pixel value determination part 212e as shown in FIG. 5B.

As the image reconstruction procedure starts, the distance information acquisition part 214 executes a set value acquisition procedure to acquire various set values (Step S01). More specifically, the distance information acquisition part 214 acquires distance information indicating the distance between the digital camera 1 and a focusing point on which the main lens LM focuses from the operation part 330 operated by the user. Here, the following explanation will be made on the presumption that the distance between the digital camera 1 and the focusing point is the object distance between the main lens LM and focusing point in FIG. 22. Furthermore, the distance information acquisition part 214 acquires various pieces of information presenting predetermined internal parameters (namely, constants specific for the digital camera 1) from the storage 230.

After the Step S01, the image information acquisition part 211 reads image data forming a captured light field image $LF_{11}$ from the storage 230 (Step S02).

Here, the light field image $LF_{11}$ will be described.

The light field image $LF_{11}$ in FIG. 3 consists of sub-images $S_{11}$ to $S_{MN}$ formed by the microlenses $L_{11}$ to $L_{MN}$ constituting the lens array $LA_{11}$ in FIG. 2, respectively. The sub-images $S_{11}$ to $S_{MN}$ each have parallax.

Figure 6:
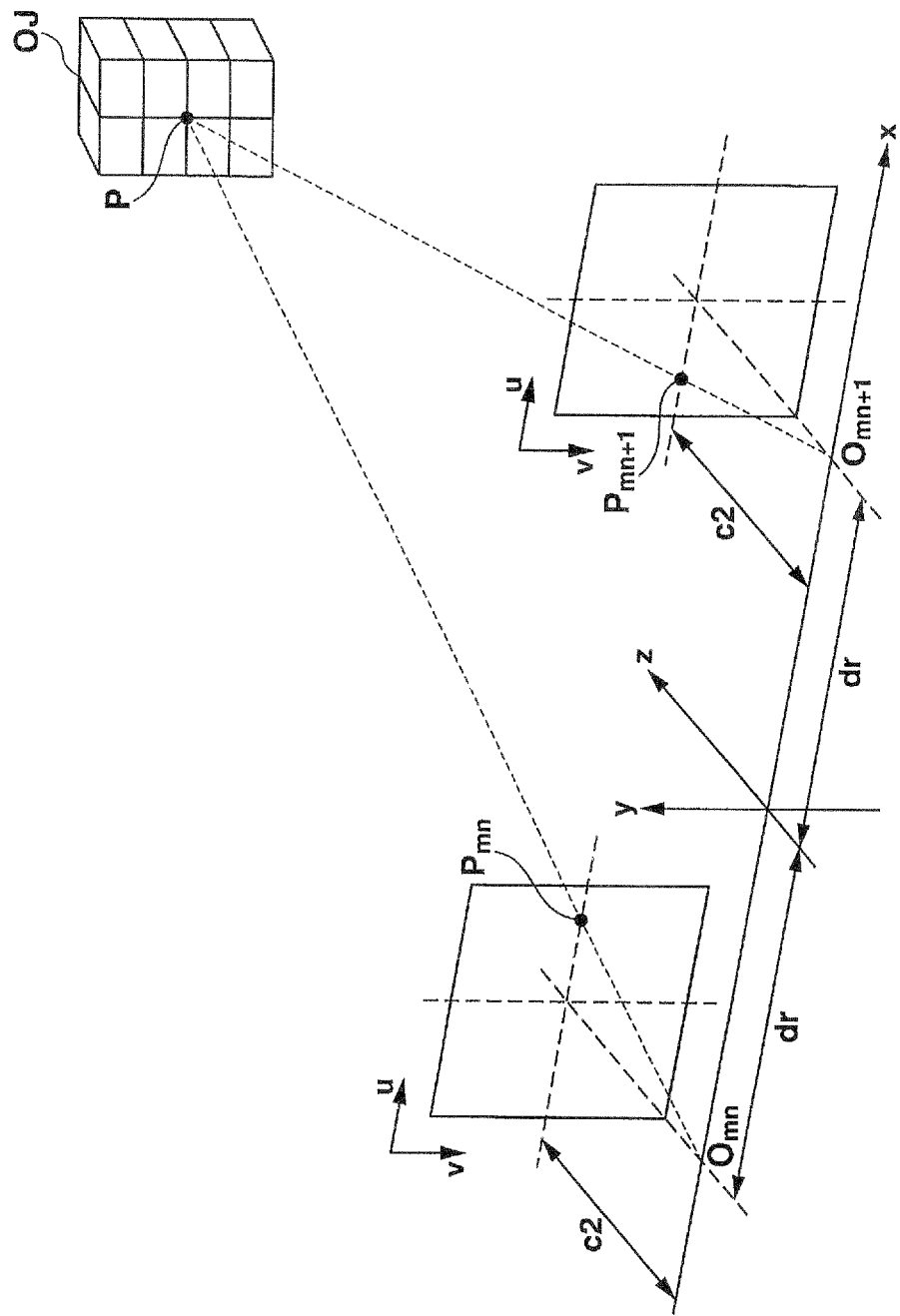
FIG. 6 is an illustration presenting an exemplary epipolar plane.

The parallax between sub-images $S_{mn}$ and $S_{mn+1}$ (m=1 to M and n=1 to N−1) will be described more specifically by way of example. As shown in FIG. 2, the center of a lens $L_{mn}$ forming a sub-image $S_{mn}$ is spaced from the center of a lens $L_{mn+1}$ forming a sub-image $S_{mn+1}$ by the lens pitch 2dr in the main scan direction (namely, in the +s-axis direction). In other words, as shown in FIG. 6, the optical center $O_{mn+1}$ determined by a lens $L_{mn+1}$ is spaced from the optical center $O_{mn}$ determined by a lens $L_{mn}$ by the lens pitch 2dr in the main scan direction (namely, in the +x-axis direction of the world coordinate system).

Therefore, the epipolar plane $O_{mn}O_{mn+1}P$ determined by the optical centers $O_{mn}$ and $O_{mn+1}$ and a point P on the object OJ is parallel to the main scan direction (namely, the u-axis of a uv image coordinate system parallel to the x-axis direction). A point $P_{mn}$ presenting the point P on the object OJ in a sub-image $S_{mn}$ and a point $P_{mn+1}$ presenting the point P in a sub-image $S_{mn+1}$ are present on the epipolar plane $O_{mn}O_{mn+1}P$ parallel to the u-axis. The difference between the points $P_{mn}$ and $P_{mn+1}$ on the uv image coordinate system manifests as parallax. In other words, a line of pixels (a pixel line, hereafter) on the epipolar plane $O_{mn}O_{mn+1}P$ in a sub-image $S_{mn}$ and a pixel line on the epipolar plane $O_{mn}O_{mn+1}P$ in a sub-image $S_{mn+1}$ cause parallax only in the main scan direction (namely, in the u-axis direction).

After the Step S02 of FIG. 4A, the interpolation part 212 executes an epipolar image ES creation procedure as shown in FIG. 7 (Step S03). Here, the epipolar image ES creation procedure is a procedure to create epipolar images $ES_{11}$ to $ES_{MK}$ as shown in FIG. 8A from the light field image $LF_{11}$ formed by the image data read in the Step S02.

Figure 9:
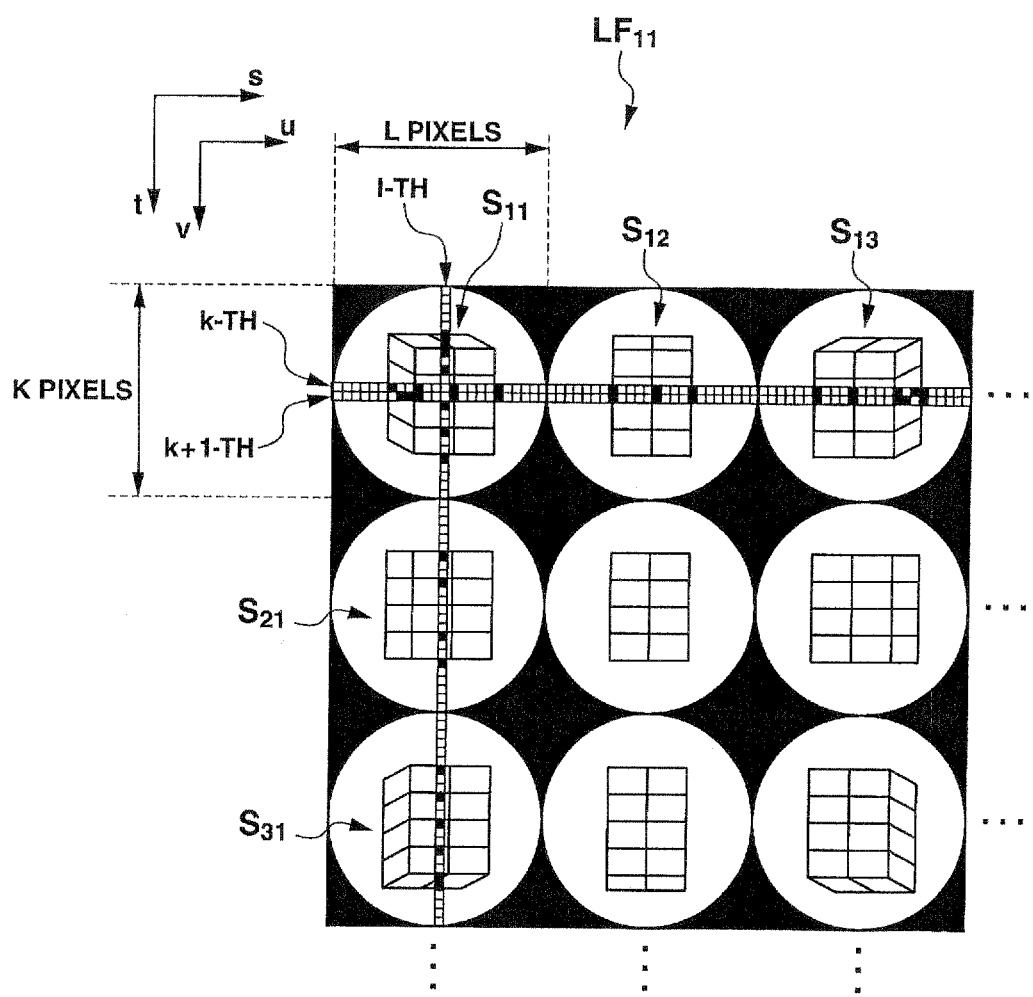
FIG. 9 is an illustration presenting pixel lines on epipolar planes of the light field image.

Here, it is assumed that as shown in FIG. 9, the +s direction (namely, the main scan direction) and the +t direction (namely, the subscan direction) of the st image coordinate system of the light field image $LF_{11}$ are parallel to the u-axis direction and the v-axis direction of the uv image coordinate system of the sub-images $S_{11}$ to $S_{mN}$ of the light field image $LF_{11}$, respectively. Then, it is assumed that the sub-images $S_{m1}$ to $S_{mN}$ each have L pixels in the s direction and K pixels in the t direction (however, the numbers of pixels K and L are generally equal). Then, the epipolar planes parallel to the s direction (the epipolar planes S, hereafter) are each given a number k (k=1 to K) in the manner that the plane having a lower t-coordinate value is given a lower number k.

In such a case, the epipolar image $ES_{mk}$ (m=1 to M and k=1 to K) of FIG. 8A comprises an image in which the pixel lines on the k-th epipolar plane S in the sub-images $S_{m1}$ to $S_{mN}$ of the light field image $LF_{11}$ as shown in FIG. 9 are arranged in the t direction in the manner that the pixel line having a smaller s-coordinate value is situated at a lower tier (namely, an image in which the pixel line at a higher tier has a greater s-coordinate value).

After the epipolar image ES creation procedure of FIG. 7 starts, the extraction part 212a of the interpolation part 212 initializes a value of a variable m to "1" (Step S31). Then, the extraction part 212a determines whether the value of the variable m is equal to or lower than a value M (equal to or lower than the number of microlenses arranged in the subscan direction) (Step S32).

If the value of the variable m is equal to or lower than the value M (Step S32; Yes), the extraction part 212a initializes a value of a variable k to "1" (Step S33). Then, the extraction part 212a determines whether the value of the variable k is equal to or lower than a value K (equal to or lower than the number of pixels in the subscan direction of a sub-image) (Step S34).

If the value of the variable k is equal to or lower than the value K (Step S34; Yes), the extraction part 212a initializes a value of a variable n to "1" (Step S35). Then, the extraction part 212a determines whether the value of the variable n is equal to or lower than a value N (equal to or lower than the number of microlenses arranged in the main scan direction) (Step S36).

If the value of the variable n is equal to or lower than the value N (Step S36; Yes), the extraction part 212a extracts the pixel line on the k-th epipolar S plane from the sub-image $S_{mn}$, and the creation part 212b creates an epipolar image $ES_{mk}$ having the extracted pixel line at the n-th tier (Step S37).

Then, the extraction part 212a increments the value of the variably n by "1" (Step S38) and repeats the above processing from the Step S36.

If the value of the variable n is greater than the value N in the Step S36 (Step S36; No), the extraction part 212a increments the value of the variable k by "1" (Step S39) and repeats the above processing from the Step S34.

If the value of the variable k is greater than the value K in the Step S34 (Step S34; No), the extraction part 212a increments the value of the variable m by "1" (Step S40) and repeats the above processing from the Step S32.

If the value of the variable m is greater than the value M in the Step S32 (Step S32; No), the extraction part 212a ends the epipolar image ES creation procedure.

The epipolar image $ES_{mk}$ (m=1 to M and k=1 to K) created through execution of the epipolar image ES creation procedure will be described hereafter with reference to FIG. 10.

Figure 10:
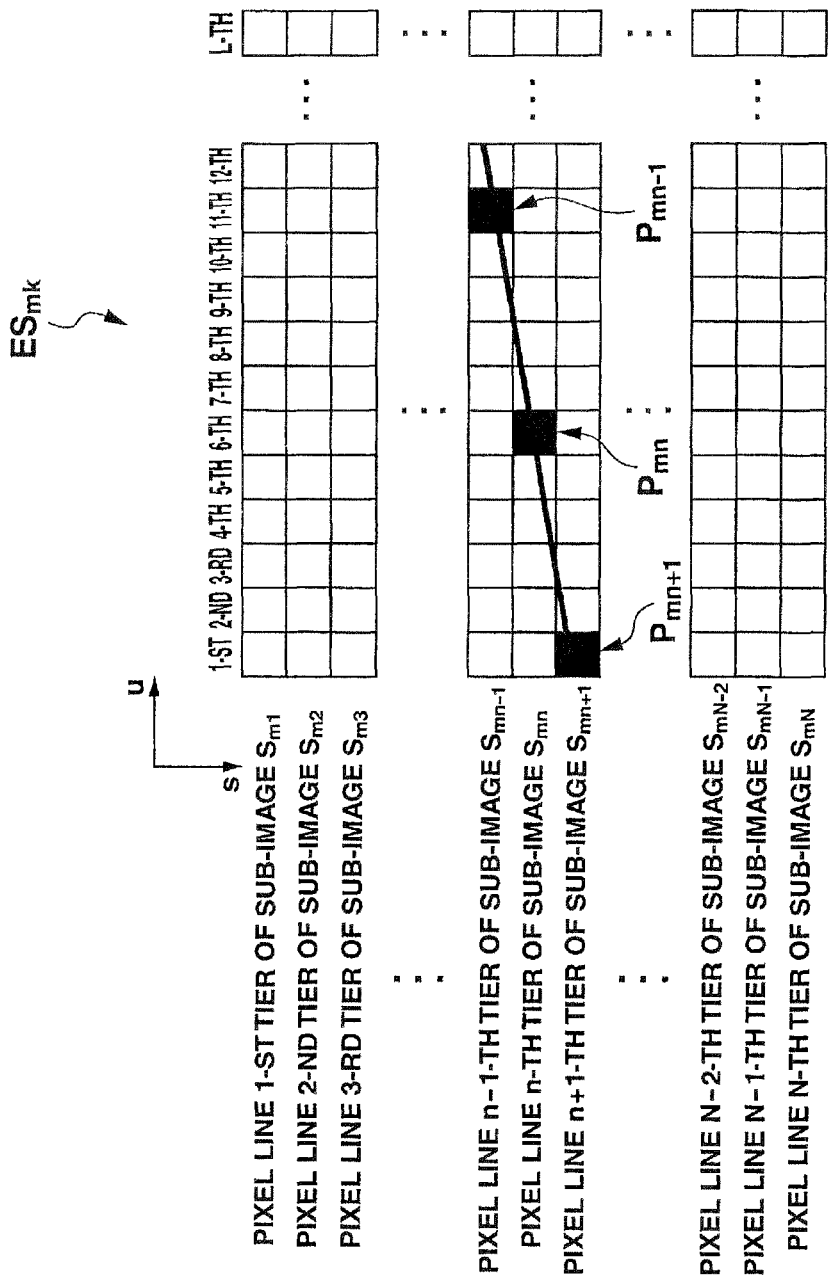
FIG. 10 is an illustration presenting an epipolar image ES in detail.

The epipolar image $ES_{mk}$ is created by arranging the pixel lines on the k-th epipolar S plane in the sub-images $S_{m1}$ to $S_{mN}$ in N tiers as shown in FIG. 10. The pixel line at the n-th tier (n=1 to N) is extracted from the sub-image $S_{mn}$.

Here, the parallax between sub-images $S_{mn}$ and $S_{mn+1}$ (n=1 to N−1) is determined by the distance between the optical centers $O_{mn}$ and $O_{mn+1}$ (namely, the lens pitch 2dr between microlenses $L_{mn}$ and $L_{mn+1}$) shown in FIG. 6, the distance between the optical centers $O_{mn}$ and $O_{mn+1}$ and a point P on the object OJ (namely, the object distance), and other internal parameters. Furthermore, as shown in FIG. 2, the microlenses $L_{m1}$ to $L_{mN}$ are arranged at the lens pitch 2dr in the main scan direction. The centers of the microlenses $L_{m1}$ to $L_{mN}$ (namely, the optical centers) are situated at a nearly equal distance from a point P on the object OJ. The other internal parameters do not change.

Therefore, the parallax between sub-images $S_{mn}$ and $S_{mn+1}$ on the same epipolar S plane is nearly equal to the parallax between sub-images $S_{mn-1}$ and $S_{mn}$ on the same epipolar S plane. Then, if points $P_{mn-1}$, $P_{mn}$, and $P_{mn+1}$ projected from the point P on the object OJ are present in the sub-images $S_{mn-1}$, $S_{mn}$, and $S_{mn+1}$, as shown in FIG. 10, the difference in u-coordinate value between a pixel presenting the point $P_{mn-1}$ on the pixel line at the n−1-th tier and a pixel presenting the point $P_{mn}$ on the pixel line at the n-th tier in the epipolar image $ES_{mk}$ is nearly equal to the difference in u-coordinate value between the point $P_{mn}$ and a pixel presenting the point $P_{mn+1}$ on the pixel line at the n+1-th tier. Then, the points $P_{mn-1}$, $P_{mn}$, and $P_{mn+1}$ are present on one and the same line in the epipolar image $ES_{mk}$.

Figure 11:
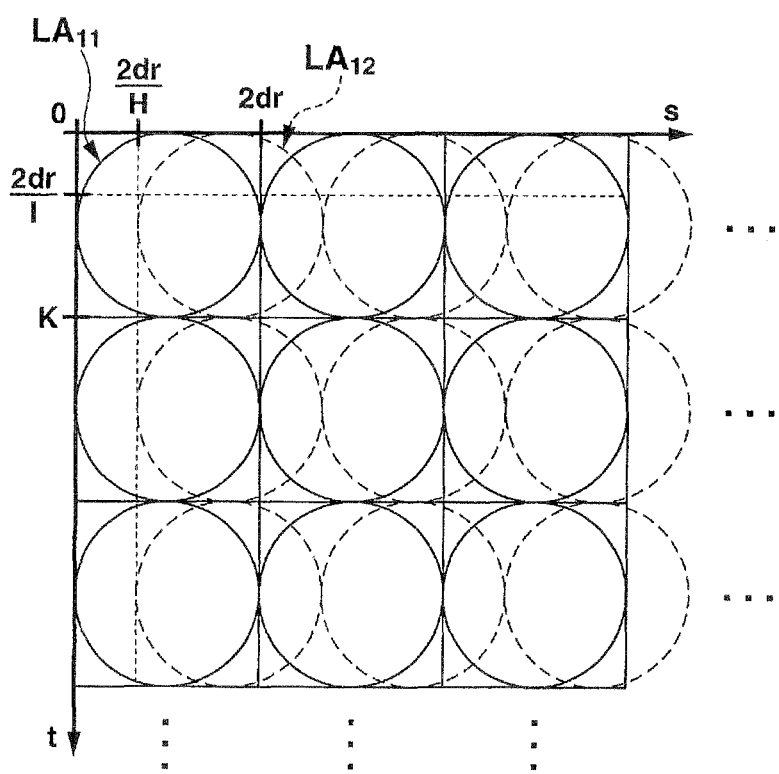
FIG. 11 is an illustration presenting an interpolated lens array.

Then, it is assumed that a lens array $LA_{12}$ having the same lens configuration as the lens array $LA_{11}$ is placed at a position shifted from the position of the lens array $LA_{11}$ by a pitch 2dr/H that is 1/H of the lens pitch 2dr of the lens array $LA_{11}$ in the +s direction as shown in FIG. 11. Similarly, it is assumed that a lens array $LA_{13}$ having the same lens configuration as the lens array $LA_{11}$ is placed at a position shifted from the position of the lens array $LA_{11}$ by a pitch 2×(2dr/H) in the +s direction. Similarly, it is assumed that up to the lens array $LA_{1H}$ is placed.

In such a case, (H−1) microlenses, a microlenses $L_{mn}$ of the lens array $LA_{12}$, a microlens $L_{mn}$ of the lens array $LA_{13}$, ..., and a microlens $L_{mn}$ of the lens array $LA_{1H}$, are interpolated between the microlenses $L_{mn}$ and $L_{mn+1}$ (m=1 to M and n=1 to N−1) of the lens array $LA_{11}$ in the +s direction at equal intervals.

Figure 12:
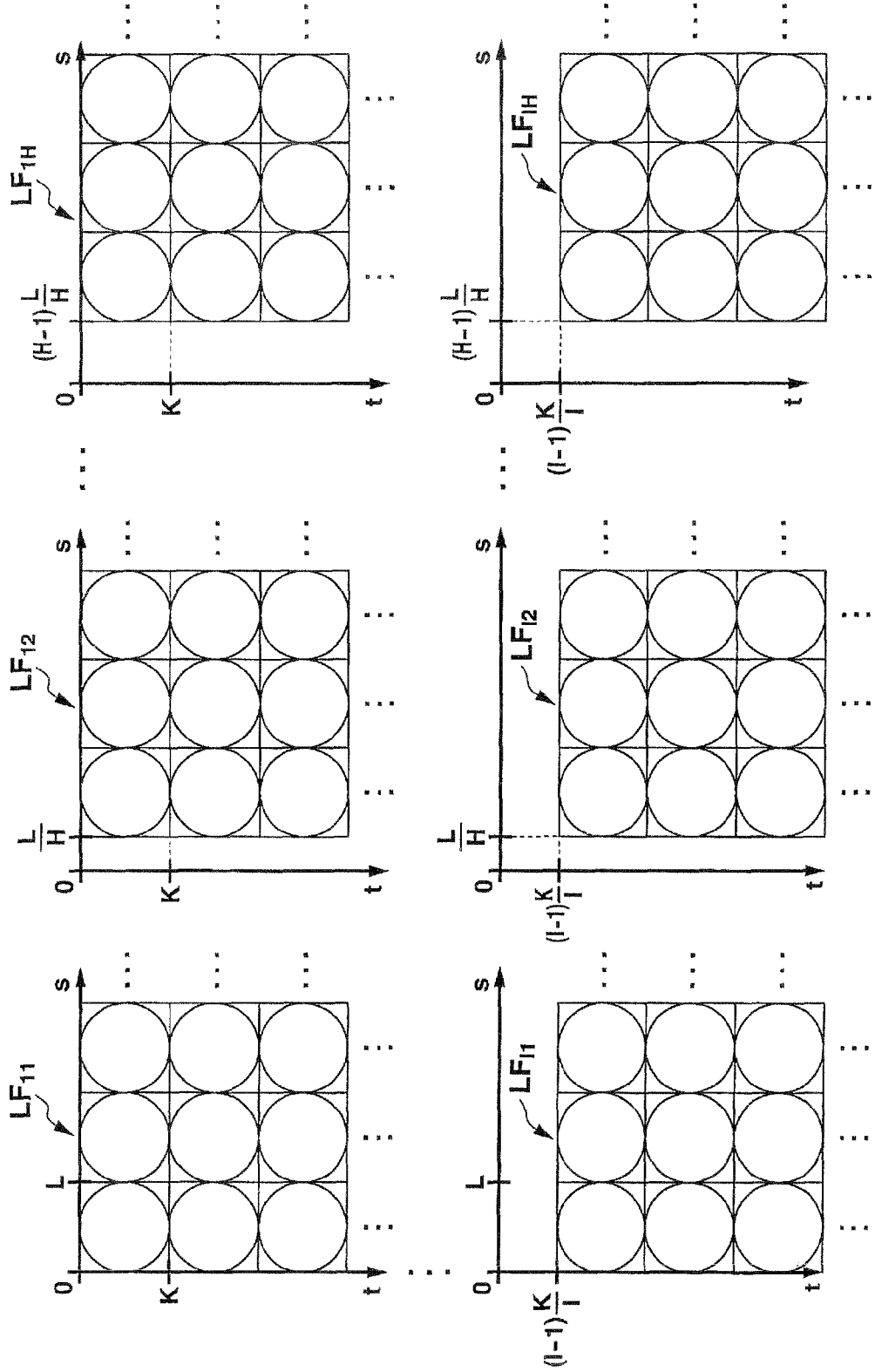
FIG. 12 is an illustration presenting interpolated light field images.

Here, the sub-images $S_{11}$ and $S_{mN}$ have L pixels in the s direction. The light field images $LF_{12}$ to $LF_{1H}$ formed by the assumed lens arrays $LA_{12}$ to $LA_{1H}$ are situated at positions shifted from the light field image $LF_{11}$ by L/H, 2× (L/H), ..., and (H−1)×(L/H), respectively, in the +s direction as shown in FIG. 12.

In other words, (H−1) sub-images, a sub-image $S_{mn}$ of the light field image $LF_{12}$, a sub-image $S_{mn}$ of the light field image $LF_{13}$, ..., and a sub-image $S_{mn}$ of the light field image $LF_{1H}$, are interpolated between the sub-images $S_{mn}$ and $S_{mn+1}$ (m=1 to M and n=1 to N−1) of the captured light field image $LF_{11}$ in the +s direction at equal intervals.

A procedure executed by the interpolation part 212 to interpolate (H−1) sub-images will be described hereafter.

Figure 13:
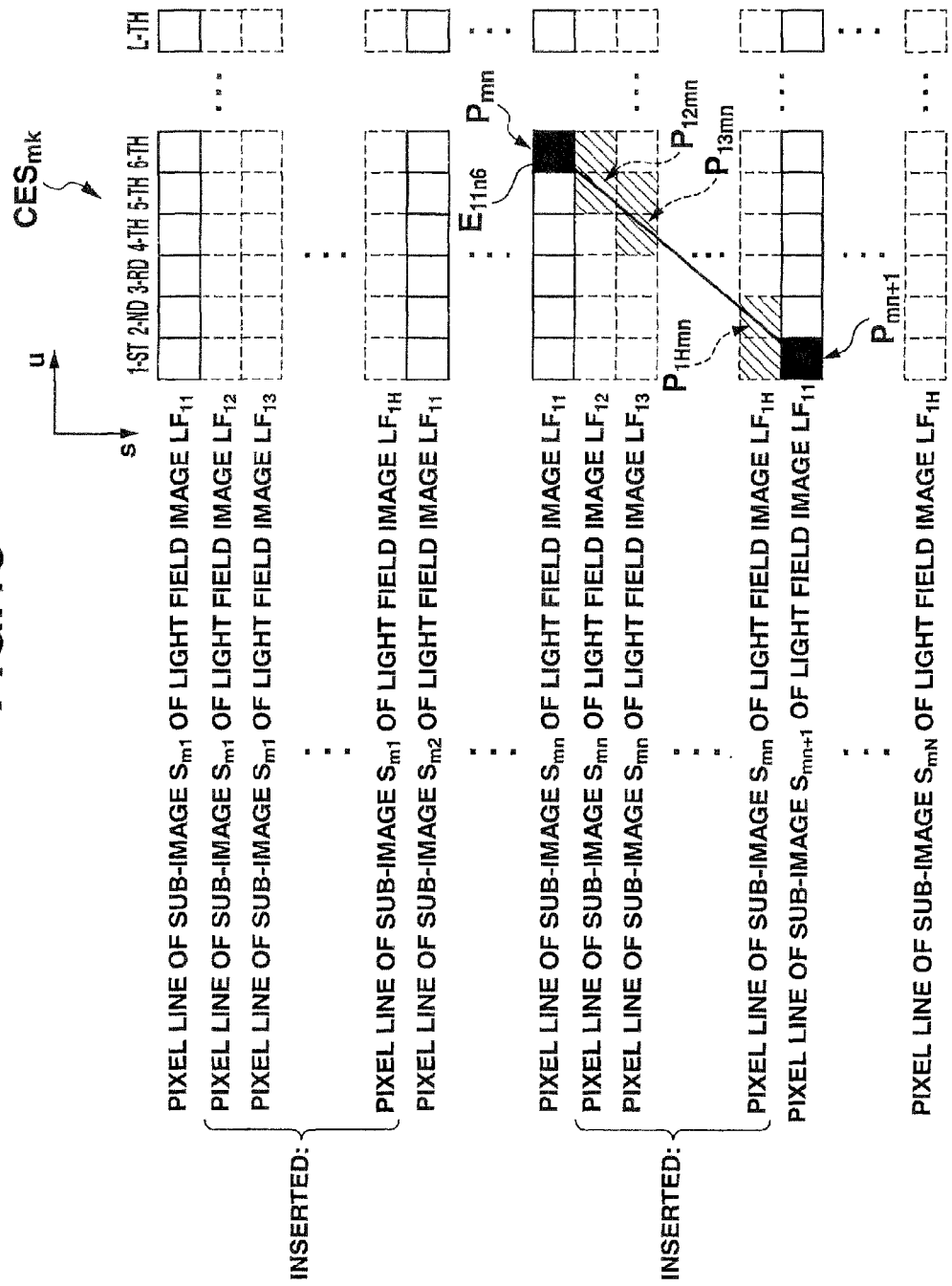
FIG. 13 is an illustration presenting an interpolated epipolar image $CES_{mk}$.

After the Step S03 of FIG. 4A, the interpolation part 212 executes an interpolated epipolar image CES creation procedure (Step S04). In this procedure, as shown in FIG. 13, (H−1) tiers are inserted between the tiers where the k-th pixel line of the sub-image $S_{mn}$ and the k-th pixel line of the sub-image $S_{mn+1}$ (n=1 to N−1) of the light field image $LF_{11}$ are stored, respectively, in the epipolar image $ES_{mk}$ (m=1 to M and k=1 to K) in FIG. 10. The inserted (H−1) tiers store (H−1) pixel lines that are, from the lowest-numbered tier, the k-th pixel line of the sub-image $S_{mn}$ of the light field image $LF_{12}$, the k-th pixel line of the sub-image $S_{mn}$ of the light field image $LF_{13}$, ..., and the k-th pixel line of the sub-image $S_{mn}$ of the light field image $LF_{1H}$, of which the pixel values have not been determined. The image in which the (H−1) pixel lines are inserted is termed an interpolated epipolar image $CES_{mk}$.

Here, the parallax between the k-th pixel line of the sub-image $S_{mn}$ of the light field image $LF_{1h}$ (h=1 to H−1) and the k-th pixel line of the sub-image $S_{mn}$ of the light field image $LF_{1h+1}$ is determined by the lens pitch 2dr/H between the microlens $L_{mn}$ of the lens array $LA_{1h}$ and the microlens $L_{mn}$ of the lens array $LA_{1h+1}$, the distance between these microlenses $L_{mn}$ and a point P on the object OJ (namely, the object distance), and internal parameters. The lens pitch, distance to a point P, and internal parameters are constant. Therefore, regardless of what the value of the variable h is in a range from 1 to H−1, the parallax between the k-th pixel line of the sub-image $S_{mn}$ of the light field image $LF_{1h}$ and the k-th pixel line of the sub-image $S_{mn}$ of the light field image $LF_{1h+1}$ is nearly constant.

Here, as shown in FIG. 13, if points $P_{mn}$ and $P_{mn+1}$ projected from a point P on the object OJ are present in the sub-images $S_{mn}$ and $S_{mn+1}$ of the light field image $LF_{11}$, points $P_{12mn}$, $P_{13mn}$, ..., and $P_{1Hmn}$ (the corresponding points to a point $P_{mn}$, hereafter) projected from the point P on the object OJ are present in the sub-images $S_{mn}$ of the interpolated light field images $LF_{12}$, ..., $LF_{1H}$.

Here, as mentioned above, the parallax is nearly constant. Therefore, the difference in u-coordinate value between the pixels presenting the points $P_{mn}$ and $P_{12nm}$, the difference in u-coordinate value between the pixels presenting the points $P_{12mn}$ and $P_{13mn}$, ..., and the difference in u-coordinate value between the pixels presenting the points $P_{1Hmn}$ and $P_{mn+1}$ in the interpolated epipolar image $CES_{mk}$ are nearly equal. Therefore, these points $P_{mn}$, $P_{12mn}$, ..., $P_{1Hmn}$, and $P_{mn+1}$ are present on one and the same line in the interpolated epipolar image $CES_{mk}$.

The above line is termed "the corresponding pixel line" hereafter. The corresponding pixel line is specified by the pixels through which the line passes and the angle θ between the line and the u-coordinate axis (which can be the v-coordinate axis). Here, the distance between a microlens $L_{mn}$ and a point P on the object OJ varies depending on the point P on the object OJ. Then, the difference in u-coordinate value (namely, parallax) between the points $P_{mn}$, $P_{12mn}$, $P_{13mn}$, ..., $P_{1Hmn}$, and $P_{mn+1}$ projected from the point P varies. Therefore, the angle θ of the corresponding pixel line varies depending on the P on the object OJ presented by the pixels through which the line passes.

Figure 14:
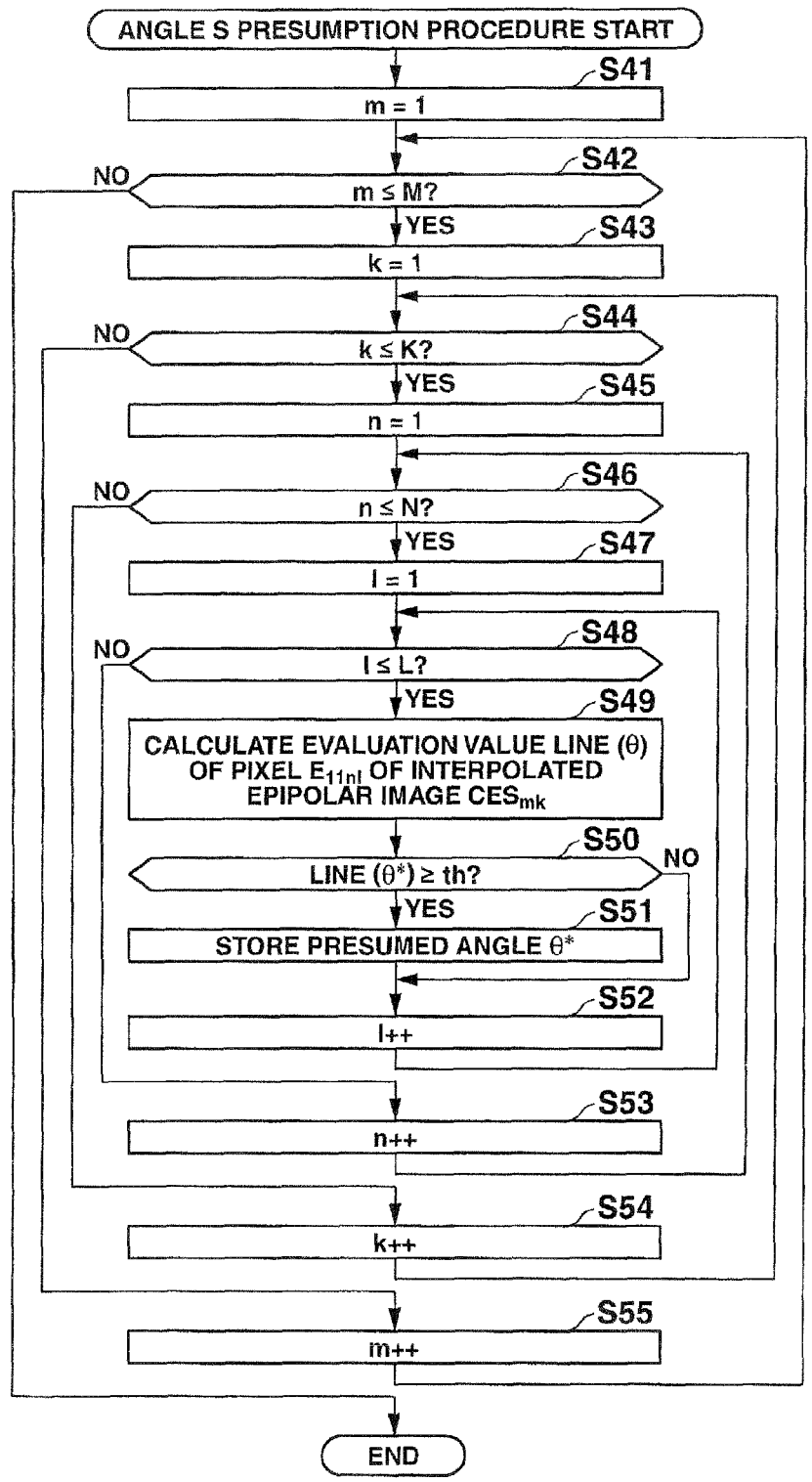
FIG. 14 is a flowchart presenting an angle S presumption procedure.

Then, after the Step S04 of FIG. 4A, the line presumption part 212c executes an angle S presumption procedure as shown in FIG. 14 to presume the angle of the corresponding pixel line in the interpolated epipolar image $CES_{mk}$ (Step S05). After the angle S presumption procedure of FIG. 14 starts, the line presumption part 212c initializes a value of a variable m to "1" (Step S41). Then, the line presumption part 212c determines whether the value of the variable m is equal to or lower than a value M (Step S42).

If the value of the variable m is equal to or lower than the value M (Step S42; Yes), the line presumption part 212c initializes a value of a variable k to "1" (Step S43). Then, the line presumption part 212c determines whether the value of the variable k is equal to or lower than a value K (Step S44).

If the value of the variable k is equal to or lower than the value K (Step S44; Yes), the line presumption part 212c initializes a value of a variable n to "1" (Step S45). Then, the line presumption part 212c determines whether the value of the variable n is equal to or lower than a value N (Step S46).

If the value of the variable n is equal to or lower than the value N (Step S46; Yes), the line presumption part 212c initializes a value of a variable l to "1" (Step S47). Then, the line presumption part 212c determines whether the value of the variable l is equal to or lower than a value L (Step S48).

If the value of the variable l is equal to or lower than the value L (Step S48; Yes), the line presumption part 212c calculates an evaluation value Line (θ) of the line EPL of an angle θ passing through a pixel $E_{11nl}$ that is the l-th pixel (namely, a pixel having the l-th lowest u-coordinate value) on the k-th pixel line of the sub-image $S_{mn}$ of the light field image $LF_{11}$ in the interpolated epipolar image CES shown in FIG. 13 using the formula (I) below (Step S49). The evaluation value is an index for how different a pixel q on the line EPL of an angle θ passing through the pixel $E_{11nl}$ from the pixel $E_{11nl}$.

$$\text{Line}(\theta) = \frac{1}{Q} \sum_{q \in EPI} |I_q - I_{11nl}| \quad (1)$$

in which EPI is a set of pixels on the line passing through the pixel $E_{11nl}$, q is an element of the set, Q is the number of elements in the set, $I_q$ is the pixel value of an element q (namely, a pixel on the line), and $I_{11nl}$ is the pixel value of the pixel $E_{11nl}$.

In the above formula (1), the sum of absolute values of the differences between the pixel value $L_{11nl}$ of the pixel $E_{11nl}$ and the pixel values $I_q$ of the pixels q on the line is divided by Q, the number of pixels on the line, because the number of pixels q on the line varies depending on the angle of the line (namely, for normalization).

After calculating the evaluation value Line (θ) for multiple angles θ, the line presumption part 212c designates the angle θ yielding the lowest evaluation value as the optimum angle θ*. Then, the line presumption part 212c presumes that the optimum angle θ* is the angle of the corresponding pixel line passing through the pixel $E_{11nl}$.

Here, as described above, the angle θ of the corresponding pixel line passing through the pixel $E_{11nl}$ varies depending on the distance to the point P presented by the pixel $E_{11nl}$ (namely, the object distance). The optimum angle θ* serves as an index for the object distance (namely, depth information). Furthermore, the evaluation value Line (θ*) serves as an index value presenting how likely the angle θ of the corresponding pixel line is to be the angle θ*.

Therefore, after the Step S49 of FIG. 14, the line presumption part 212c determines whether the evaluation value Line (θ*) is equal to or greater than a predetermined threshold th (Step S50). If the evaluation value Line (θ*) is equal to or greater than the predetermined threshold th (Step S50; Yes), the line presumption part 212c associates and stores information identifying the interpolated epipolar image $CES_{mk}$ (the interpolated epipolar image ID, hereafter), information identifying the pixel $E_{11nl}$ through which the corresponding pixel line passes (the pixel ID, hereafter), and information presenting the presumed angle θ* in a presumed angle S table of FIG. 15 stored in the storage 230 (Step S51). Here, the interpolated epipolar image ID is presented by the values of the variables m and k. The pixel ID is presented by the values of the variables n and l.

Information presenting the threshold th is stored in the storage 230 in advance. The threshold th can be an optimum value determined through experiments by a person of ordinary skill in the art. Alternatively, the threshold th may be set to a value specified by the user based on signals output from the operation part 330 operated by the user.

If the evaluation value Line (θ*) is lower than the predetermined threshold th in the step S50 of FIG. 14 (Step S50; No), the line presumption part 212c does not store information presenting the presumed angle θ* in the presumed angle S table of FIG. 15, but associates and stores information indicating that the presumed angle θ* is unknown and the interpolated epipolar image ID and pixel ID.

Provided that multiple pixels in multiple sub-images $S_{mk}$ present the same point P on the object OJ, when the point P is in a region of significantly high contrast on the object OJ, it is highly unlikely that the difference in pixel value among these pixels is smaller than a given value. On the other hand, when the point is in a region of insignificantly high contrast such as in a white wall region, the difference in pixel value among multiple pixels in such a region may be smaller than a given value even if they present multiple different points. Therefore, if the evaluation value Line (θ*) is lower than a predetermined threshold th, the line presumption part 212c presumes that the line of the angle θ* passing through the pixel $E_{11nl}$ may not be the line passing through multiple pixels presenting the same point P on the object OJ, and stores information indicating that the presumed angle θ* is unknown in the presumed angle S table of FIG. 15.

Then, or after the Step S51, the line presumption part 212c increments the value of the variable l by "1" (Step S52) and repeats the above processing from the Step S48.

If the value of the variable l is greater than the value L in the Step S48 (Step S48; No), the line presumption part 212c increments the value of the variable n by "1" (Step S53) and repeats the above processing from the Step S46.

If the value of the variable n is greater than the value N in the Step S46 (Step S46; No), the line presumption part 212c increments the value of the variable k by "1" (Step S54) and repeats the above processing from the Step S44.

If the value of the variable k is greater than the value K in the Step S44 (Step S44; No), the line presumption part 212c increments the value of the variable m by "1" (Step S55) and repeats the above processing from the Step S42.

If the value of the variable m is greater than the value M in the Step S42 (Step S42; No), the line presumption part 212c ends the angle S presumption procedure.

After the Step S05 of FIG. 4A, a pixel S interpolation procedure, as shown in FIGS. 16A and 16B, to determine the pixel values of interpolated light field images $LF_{1h}$ (h=2 to H) based on the line presumed to be the corresponding pixel line (the presumed line, hereafter) will be executed (Step S06).

The pixel presumption part 212d executes the same processing as of the Steps S41 to S48 of FIG. 14 (Steps S61 to S68).

If the value of the variable l is equal to or lower than the value L in the Step S68 (Step S68; Yes), the pixel presumption part 212d acquires from the presumed angle S table of FIG. 15 information presenting the presumed angle θ* associated with the interpolated epipolar image ID of the interpolated epipolar image $CES_{mk}$ (namely, the values of the variables m and k) and the pixel ID of the pixel $E_{11nl}$ (namely, the values of the variables n and l) (Step S69).

Then, the pixel presumption part 212d determines whether information presenting the presumed angle θ* is acquired (namely, whether information presenting the presumed angle θ* associated with the values of the variables m, k, n, and l is stored) (Step S70). If information presenting the presumed angle θ* is acquired (Step S70; Yes), the pixel presumption part 212d initializes a value of a variable h to "2" (Step S71).

Then, the pixel presumption part 212d determines whether the value of the variable h is equal to or lower than a value H (Step S72). If the value of the variable h is equal to or lower than a value H (Step S72; Yes), the pixel presumption part 212d presumes a corresponding pixel based on the intersection between the pixel line of the sub-image $S_{mn}$ of the light field image $LF_{1h}$ and the presumed line (Step S73).

More specifically, as shown in FIG. 17, the pixel presumption part 212d assumes that the center of the l-th pixel constituting the k-th pixel line of the sub-image $S_{mn}$ of the interpolated light field image $LF_{1h}$ in the interpolated epipolar image CES is $C_{hl}$. The pixel presumption part 212d identifies the intersection $CP_h$ between the line passing through the centers $C_{h1}$ to $C_{hL}$ and parallel to the u-axis (the interpolated pixel line, hereafter) and the corresponding pixel line. Then, the pixel presumption part 212d identifies two centers $C_{ha}$ and $C_{hb}$ on either side of the intersection $CP_h$. The pixel presumption part 212d presumes that the pixel $E_{1hna}$ having the center $C_{ha}$ and the pixel $E_{1hnb}$ having the center $C_{hb}$ are the pixels presenting the corresponding point $P_{1hmn}$ to the point $P_{mn}$ presented by the pixel $E_{11nl}$.

After the step S73 of FIG. 16B, the pixel value determination part 212e determines the pixel values of the corresponding pixels $E_{1hna}$ and $E_{1hnb}$ presumed in the Step S73 based on the pixel value $I_{11nl}$ of the pixel $E_{11nl}$ (Step S74).

More specifically, the pixel value determination part 212e calculates the distance $r_{ha}$ between the identified center $C_{ha}$ and intersection $CP_h$ and the distance $r_{hb}$ between the identified center $C_{hb}$ and intersection $CP_h$. Then, the pixel value determination part 212e determines a value $\Delta I_{1hna}$ to be added to the pixel value $I_{1hna}$ of the corresponding pixel $E_{1hna}$ and a value $\Delta I_{1hnb}$ to be added to the pixel value $I_{1hnb}$ of the corresponding pixel $E_{1hnb}$.

$$\Delta I_{1hna} = r_{hb}/(r_{ha}+r_{hb}) \times I_{11nl} \quad (2)$$

$$\Delta I_{1hnb} = r_{ha}/(r_{ha}+r_{hb}) \times I_{11nl} \quad (3)$$

Here, $r_{hb}/(r_{ha}+r_{hb})$ and $r_{ha}/(r_{ha}+r_{hb})$ are weighting coefficients.

Then, the pixel value determination part 212e makes reference, from the storage 230, to an interpolated pixel table as shown in FIG. 18 in which the pixel values of pixels constituting an interpolated light field image (the interpolated light field image, hereafter) $LF_{1h}$ are stored. The interpolated pixel table associates and stores the interpolated epipolar image ID of interpolated epipolar images $CES_{mk}$ (m=1 to M and k=1 to K) consisting of pixel lines constituting an interpolated light field image $LF_{1h}$, the pixel ID of pixels constituting the pixel line, and information presenting the pixel values of the pixels.

Then, the pixel value determination part 212e acquires information presenting the pixel value $I_{1hna}$ associated with the interpolated epipolar image ID presented by the values of the variables m and k and the pixel ID of the corresponding pixel $E_{1hna}$ presented by the value of the variable n and a specified value a. Then, the pixel value determination part 212e redetermines the sum of the pixel value $I_{1hna}$ and additional value $\Delta I_{1hna}$ to be the pixel value $I_{1hna}$ of the corresponding pixel $E_{1hna}$.

Similarly, the pixel value determination part 212e acquires information presenting the pixel value $I_{1hnb}$ associated with the interpolated epipolar image ID and the pixel ID of the corresponding pixel $E_{1hnb}$. Then, the pixel value determination part 212e redetermines the sum of the pixel value $I_{1hnb}$ and additional value $\Delta I_{1hnb}$ to be the pixel value $I_{1hnb}$ of the corresponding pixel $E_{1hnb}$ (Step S74). Here, R, G, and B values as examples of the pixel value $I_{1hnl}$ (n=1 to N and l=1 to L) stored in the interpolated pixel table are all initialized to "0" at the beginning of the pixel S interpolation procedure.

Then, the pixel value determination part 212e updates information associated with the interpolated epipolar image ID and the pixel ID of the corresponding pixel $E_{1hna}$ using information presenting the determined pixel value $T_{1hna}$. Similarly, the pixel value determination part 212e updates information associated with the interpolated epipolar image ID and the pixel ID of the corresponding pixel $E_{1hnb}$ using information presenting the determined pixel value $I_{1hnb}$ (Step S75).

Then, the pixel presumption part 212d increments the value of the variable h by "1" (Step S76) and repeats the above processing from the Step S72.

If information presenting the presumed angle θ* is not acquired in the Step S70 (Step S70; No), or if the value of the variable h is greater than the value H in the Step S72 (Step S72; No), the pixel presumption part 212d executes the same processing as of the Steps S52 to S55 of FIG. 14 (Steps S77 to S80) and ends execution of the pixel S interpolation procedure.

After the Step S06 of FIG. 4A, the interpolation part 212 executes an interpolated light field image S creation procedure to create interpolated light field images $LF_{12}$ to $LF_{1H}$ based on the interpolated epipolar images $CES_{mk}$ (m=1 to M and k=1 to K) of which the pixel values $I_{1hnl}$ (h=2 to H, n=1 to N, and l=1 to L) are determined (Step S07). Then, the interpolation part 212 stores image data forming the created interpolated light field images $LF_{12}$ to $LF_{1H}$ in the storage 230.

Through the above processing, the interpolated light field images $LF_{12}$ to $LF_{1H}$ as shown in FIG. 12, which would be formed when the lens arrays $LA_{12}$ to $LA_{1H}$ were placed, are created based on the light field image $LF_{11}$ formed by the lens array $LA_{11}$.

In the subsequent processing, it is assumed that a lens array $LA_{21}$ having the same lens configuration as the lens array $LA_{11}$ is placed at a position shifted from the position of the lens array $LA_{11}$ by a pitch 2dr/I that is 1/I of the lens pitch 2dr of the lens array $LA_{11}$ in the +t direction. Assuming that lens arrays $LA_{31}$ to $LA_{I1}$ are similarly placed, interpolated light field images $LF_{21}$ to $LF_{I1}$ formed by the lens arrays $LA_{21}$ to $LA_{I1}$ respectively are created based on the captured light field image $LF_{11}$.

Then, assuming that lens arrays $LA_{22}$ to $LA_{I2}$ are placed, interpolated light field images $LF_{22}$ to $LF_{I2}$ are created based on the interpolated light field image $LF_{12}$. Similarly, assuming that lens arrays $LA_{2H}$ to $LA_{IH}$ are placed, interpolated light field images $LF_{2H}$ to $LF_{IH}$ are created.

After the step S07 of FIG. 4A, the interpolation part 212 initializes a value of a variable h to "1" (Step S08). Then, the interpolation part 212 determines whether the value of the variable h is equal to or lower than a value H (Step S09). If the interpolation part 212 determines that the value of the variable h is equal to or lower than the value H (Step S09; Yes), the image information acquisition part 211 reads image data of the light field image $LF_{1h}$ from the storage 230 as in the Step S02 (Step S10).

Then, the interpolation part 212 executes an epipolar image ET creation procedure similar to the one in the Step S03 (Step S11). The epipolar image ET creation procedure is a procedure to create epipolar images $ET_{11}$ to $ET_{NL}$ as shown in FIG. 8B from the light field image $LF_{1h}$ formed by the image data read in the Step S10.

More specifically, the interpolation part 212 gives a number l (l=1 to L) to the epipolar planes parallel to the t direction (the epipolar T planes, hereafter) in the manner that the plane having a lower s-coordinate value is given a lower number l as shown in FIG. 9. In such a case, the epipolar image $ET_{nl}$ (n=1 to N and l=1 to L) of FIG. 8B is an image formed by arranging the pixel lines on the l-th epipolar T plane in the sub-images $S_{1n}$ to $S_{Mn}$ of the light field image $LF_{1h}$ as shown in FIG. 9 in the s direction in the manner that the pixel line having a smaller t-coordinate value is at a lower tier (namely, an image in which the pixel line at a higher tier has a greater t-coordinate value).

Figure 19:
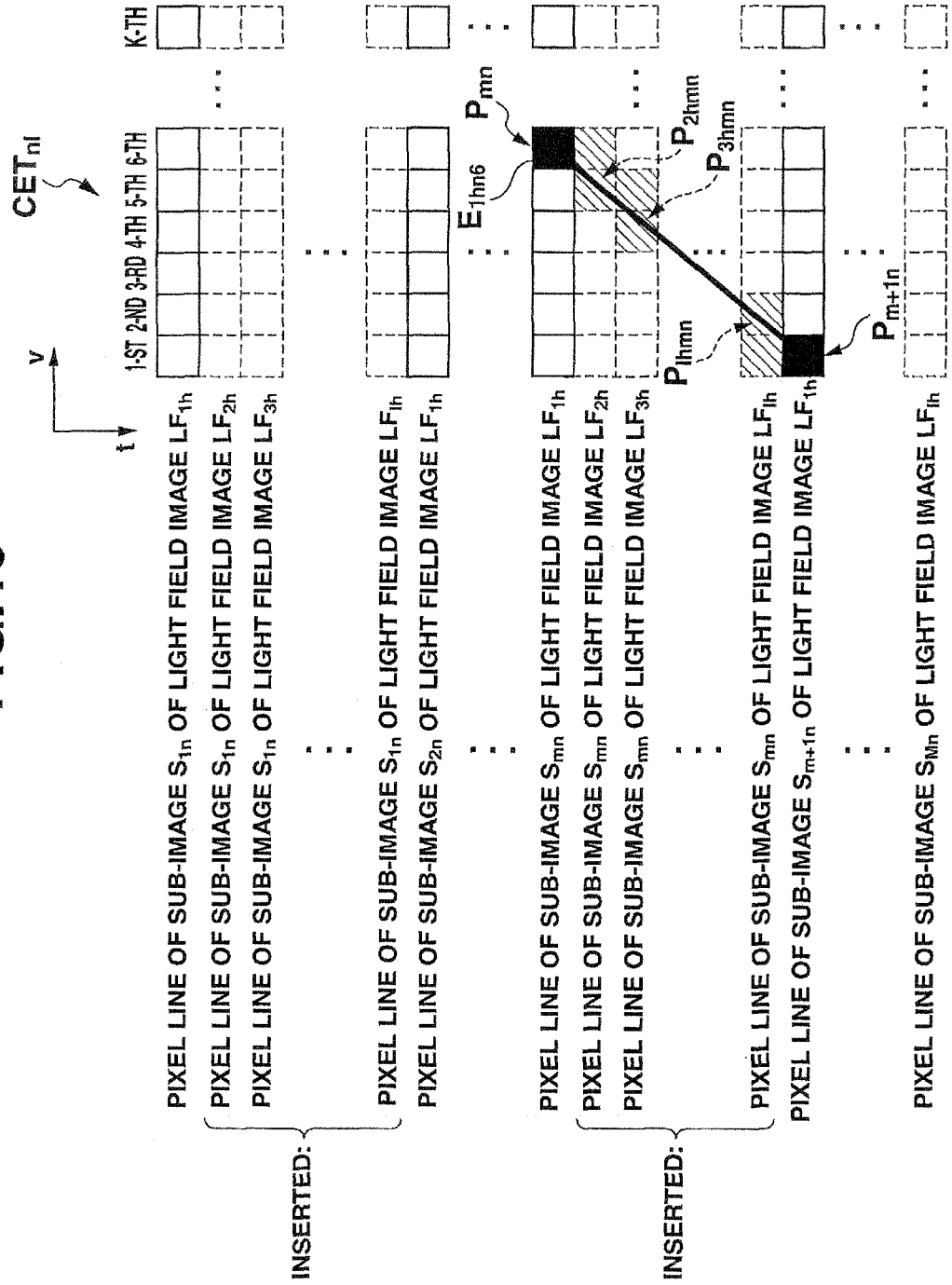
FIG. 19 is an illustration presenting an interpolated epipolar image $CET_{nl}$.

After the Step S11 of FIG. 4B, the interpolation part 212 executes an interpolated epipolar image CET creation procedure as in the step S04 (Step S12). In this procedure, as shown in FIG. 19, (l−1) tiers are inserted between the tiers where the l-th pixel line of a sub-image $S_{mn}$ and the l-th pixel line of $S_{m+1n}$ (m=1 to M−1) of the light field image $LF_{1h}$ are stored, respectively, in the epipolar image $ET_{nl}$ (n=1 to N and l=1 to L). The inserted (l−1) tiers store (l−1) pixel lines that are, from the lowest-numbered tier, the l-th pixel line of the sub-image $S_{mn}$ of the light field image $LF_{2h}$, the l-th pixel line of the sub-image $S_{mn}$ of the light field image $LF_{3h}$, . . . , and the l-th pixel line of the sub-image $S_{mn}$ of the light field image $LF_{1h}$, of which the pixel values have not been determined. The image in which the (l−1) pixel lines are inserted is termed an interpolated epipolar image $CET_{nl}$.

After the Step S12 of FIG. 4B, the line presumption part 212c executes an angle T presume procedure to presume the angle of the corresponding pixel line of the interpolated epipolar image $CET_{nl}$ as in the Step S05 (Step S13).

Then, the pixel presumption part 212d and pixel value determination part 212e executes a pixel T interpolation procedure to determine the pixel values of the interpolated light field image $LF_{ih}$ (i=2 to I) based on the presumed line presumed in the Step S13 (Step S14).

Then, the interpolation part 212 executes an interpolated light field image T creation procedure to create interpolated light field images $LF_{2h}$ to $LF_{Ih}$ based on the interpolated epipolar image $CET_{nl}$ (n=1 to N and l=1 to L) of which the pixel values $I_{ihmk}$ (i=2 to I, m=1 to M, and k=1 to K) are determined in the Step S14 (Step S15).

Then, the interpolation part 212 increments the value of the variable h by "1" and repeats the above processing from the Step S09.

Figure 20A:
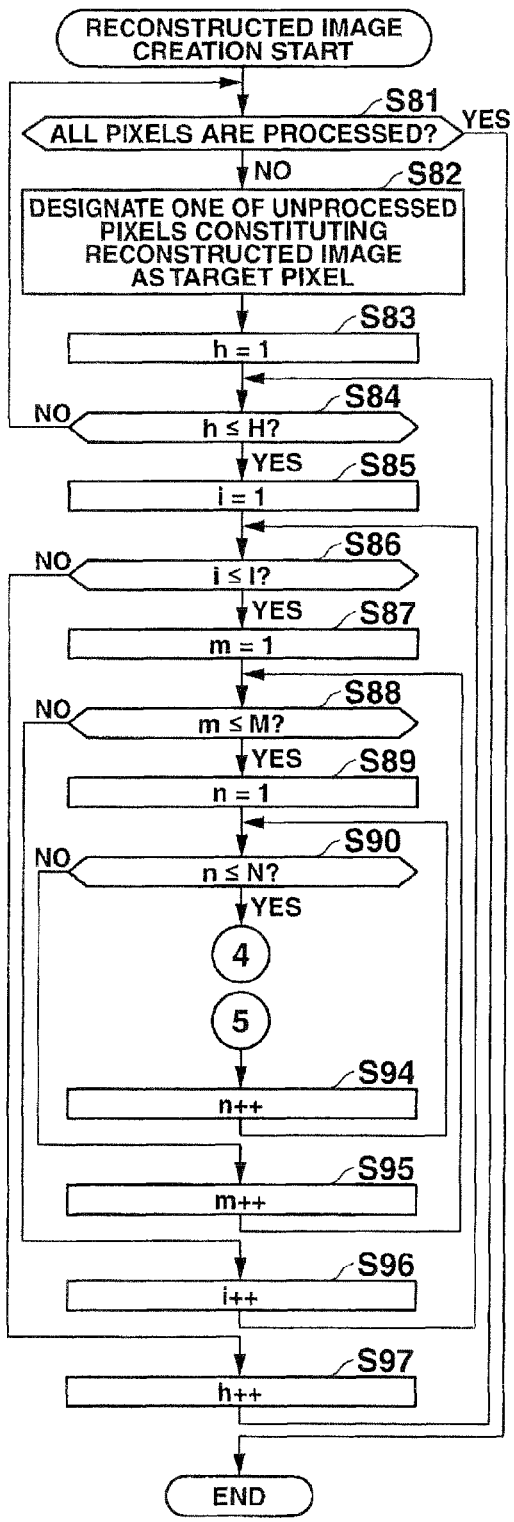
FIGS. 20A and 20B are flowcharts presenting a reconstructed image creation procedure.
Figure 20B:
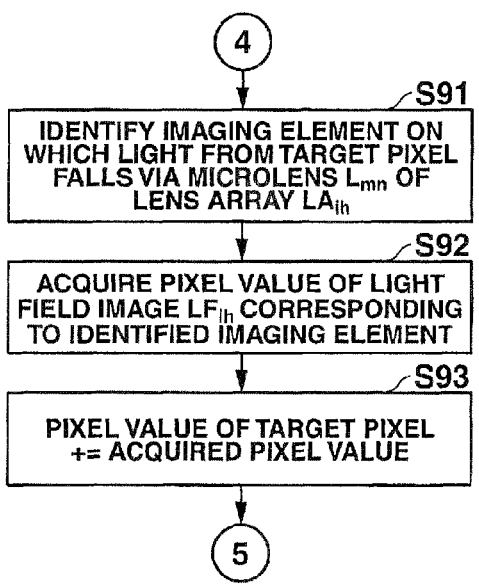

If the value of the variable h is greater than the value H in Step S09 (Step S09; No), the reconstruction part 215 executes a reconstructed image creation procedure as shown in FIGS. 20A and 20B to create an object image (namely, a reconstructed image) OB formed by the main lens LM focused (namely, post-focused) on a point at a distance indicated by the distance information acquired in the Step S01 based on the light field images $LF_{11}$ to $LF_{1H}$ (Step S17).

After the reconstructed image creation procedure starts, the reconstruction part 215 determines whether the procedures such as the following Step S82 are conducted on all pixels constituting the reconstructed image OB (Step S81). If not all pixels are processed (Step S81; No), the reconstruction part 215 designates an unprocessed pixel as the target pixel among multiple pixels constituting the reconstructed image OB (Step S82).

Then, the reconstruction part 215 initializes a value of a variable h to "1" (Step S83). Then, the reconstruction part determines whether the value of the variable h is equal to or lower than a value H (Step S84). If the value of the variable h is equal to or lower than a value H (Step S84; Yes), the reconstruction part 215 initializes a value of a variable i to "1" (Step S85). Then, the reconstruction part determines whether the value of the variable i is equal to or lower than a value I (Step S86).

If the value of the variable i is equal to or lower than the value I (Step S86; Yes), the reconstruction part 215 initializes a value of a variable m to "1" (Step S87). Then, the reconstruction part 215 determines whether the value of the variable m is equal to or lower than a value M (Step S88). If the value of the variable m is equal to or lower than the value M (Step S88; Yes), the reconstruction part 215 initializes a value of a variable n to "1" (Step S89). Then, the reconstruction part 215 determines whether the value of the variable n is equal to or lower than a value N (Step S90).

If the value of the variable n is equal to or lower than the value N (Step S90; Yes), the reconstruction part 215 identifies the trajectory of light emitted from the position PS of the target pixel as shown in FIG. 22 and reaching the imaging element surface IE via the microlens $L_{mn}$ of the lens array $LA_{ih}$, and identifies the imaging element present at the destination point $PE_{mn}$ where light following the identified trajectory falls on the imaging element surface IE (Step S91).

More specifically, it is assumed that the distance between the target pixel position PS and optical axis OA and the distance between the destination point $PE_{mn}$ and optical axis OA in the X-axis direction are x and $x''_{mn}$, respectively, as shown in FIG. 22.

Here, the internal parameters acquired in the Step S01 include the focal length $f_{ML}$ of the main lens LM, distance c1 between the main lens LM and microlens array $LA_{ih}$, distance c2 between the microlens array $LA_{ih}$ and imaging element surface IE, and the distance d between the optical axis OA and the principal point of the microlens $L_{mn}$ calculated based on the lens pitch 2dr. Furthermore, the distance indicated by the distance information acquired in the Step S01 is the object distance a1 between the main lens LM and focused point.

Then, the reconstruction part 215 applies the focal length $f_{ML}$ and object distance a1 to the formula (4) below to calculate the distance b1 between the main lens LM and the image-forming plane of the main lens LM.

$$b1 = \frac{a1 \cdot f_{ML}}{a1 \times f_{ML}} \tag{4}$$

Then, the reconstruction part 215 applies the object distance a1 and the distance b1 calculated using the above formula (4) to the formula (5) below to calculate the distance x' between the optical axis OA and the image-forming point PF of the main lens LM.

$$x' = x \times \frac{b1}{a1} \tag{5}$$

Then, the reconstruction part 215 applies the distance c1 between the main lens LM and the microlens array $LA_{ih}$ and the distance b1 calculated using the above formula (4) to the formula (6) below to calculate the distance a2 between the image-forming plane of the main lens LM and the microlens $L_{mn}$.

$$a2 = c1 - b1 \tag{6}$$

Then, the reconstruction part 215 applies the distance d between the optical axis OA and the principal point of the microlens $L_{mn}$, the distance x' calculated using the above formula (5), the distance c2 between the microlens array $LA_{ih}$ and imaging element surface IE, and the distance a2 calculated using the above formula (6) to the formula (7) below to calculate the distance $x''_{mn}$ between the destination point $PE_{mn}$ and optical axis OA.

$$x''_{mn} = (d - x') \times \frac{c2}{a2} + d \tag{7}$$

Here, the calculation formulae (4) and (6) in regard to the Z-axis direction of FIG. 22 is derived from the Gaussian imaging formula. The calculation formulae (5) and (7) in regard to the X-axis direction is deduced from the similarity relationship of triangles. In the above formulae (5) and (7), the symbols x, x', and $x''_{mn}$ are employed to calculate the distance between the target pixel position PS and optical axis OA, distance between the optical axis OA and image-forming point PF of the main lens LM, and distance between the destination point $PE_{mn}$ and optical axis OA in the X-axis direction. Similarly employing symbols y, y', and y''$_{mn}$ in the above formulae (5) and (7), the distance between the target pixel position PS and optical axis OA, distance between the optical axis OA and image-forming point PF of the main lens LM, and distance between the destination point $PE_{mn}$ and optical axis OA in the Y-axis direction perpendicular to both the X-axis and Z-axis directions can be calculated.

After the Step S91 of FIG. 20B, the reconstruction part 215 identifies a pixel in the sub-image $S_{mn}$ of the light field image $LF_{ih}$ corresponding to the image sensor (namely, the imaging element) 120 present at the identified destination point $PE_{mn}$, and acquires the pixel value of the identified pixel (Step S92). Thereafter, the reconstruction part 215 adds the acquired pixel value to the pixel value of the target pixel (Step S93). Here, R, G, and B values as examples of the pixel values of the target pixel are initialized to "0" at the beginning of the reconstructed image creation procedure.

Then, the reconstruction part 215 increments the value of the variable n by "1" (Step S94) and repeats the above processing from the step S90.

If the value of the variable n is greater than the value N in the Step S90 (Step S90; No), the reconstruction part 215 increments the value of the variable m by "1" (Step S95) and repeats the above processing from the Step S88.

If the value of the variable m is greater than the value M in the Step S88 (Step S88; No), the reconstruction part 215 increments the value of the variable i by "1" (Step S96) and repeats the above processing from the Step S86.

If the value of the variable i is greater than the value I in the Step S86 (Step S86; No), the reconstruction part 215 increments the value of the variable h by "1" (Step S97) and repeats the above processing from the Step S84.

If the value of the variable h is greater than the value H in the Step S84 (Step S84; No), the reconstruction part 215 repeats the above processing from the Step S81.

If it is determined in the Step S81 that all pixels are processed (Step S81; Yes), the reconstruction part 215 ends execution of the reconstructed image creation.

After the Step S17 of FIG. 4B, the image information output part 216 outputs image data of the reconstructed image OB reconstructed in the Step S17 to the display part 320 (Step S18) and ends execution of the reconstructed image creation procedure. Here, the image information output part 216 may store the image data of the reconstructed image OB on a recording medium or output the image data of the reconstructed image OB to another device via the external OF part 310.

With the above configuration, assuming that a microlens $L_{mn}$ (m=1 to M and n=1 to N−1) constituting a microlens array $LA_{1h}$ (h=2 to H) are placed between the microlenses $L_{mn}$ and $L_{mn+1}$ of the lens array $LA_{11}$, the pitch between the microlens $L_{mn}$ of the microlens array $LA_{11}$ and the microlens $L_{mn}$ of the assumed microlens array $LA_{1h}$ is smaller than the lens pitch 2dr between the microlenses $L_{mn}$ and $L_{mn+1}$ of the microlens array $LA_{11}$. Therefore, the parallax between the sub-image $S_{mn}$ of the light field image $LF_{11}$ and the sub-image $S_{mn}$ of the interpolated light field image $LF_{1h}$ is smaller than the parallax between the sub-images $S_{mn}$ and $S_{mn+1}$ of the light field image $LF_{11}$ respectively formed by the microlenses $L_{mn}$ and $L_{mn+1}$ of the microlens array $LA_{11}$. In other words, with the above configuration, a sub-image $S_{mn}$ of a light field image $LF_{1h}$ having a smaller parallax can be interpolated between the sub-images $S_{mn}$ and $S_{mn+1}$ of the light field image $LF_{11}$. Then, missing pixels necessary for a reconstructed image OB can be interpolated; a reconstructed image OB having less periodic noise than the prior art can be created.

Furthermore, the parallax between images formed by two lenses varies according to the pitch of the two lenses. Therefore, with the above configuration, a sub-image $S_{mn}$ of a light field image $LF_{1h}$ (h=2 to H) is interpolated so that the ratio of the parallax between the sub-image $S_{mn}$ of the light field image $LF_{11}$ and the sub-image $S_{mn}$ of the interpolated light field image $LF_{1h}$ to the parallax between the sub-images $S_{mn}$ and $S_{mn+1}$ of the light field image $LF_{11}$ is equal to the ratio of the distance between the microlens $L_{mn}$ of the lens array $LA_{11}$ and the microlens $L_{mn}$ of the assumed lens array $LA_{1h}$ to the distance between the microlenses $L_{mn}$ and $L_{mn+1}$ of the lens array $LA_{11}$. Consequently, a sub-image $S_{mn}$ of a light field image $LF_{1h}$ can be interpolated with higher accuracy than the prior art; a reconstructed image OB having less noise than the prior art can be created.

Furthermore, a point P on an object OJ, a point $P_{mn}$ projected from the point P on a sub-image $S_{mn}$ of the light field image $LF_{11}$, and a point $P_{mn+1}$ projected from the point P on a sub-image $S_{mn+1}$ of the light field image $LF_{11}$ are present on an epipolar plane. Furthermore, the pixel presenting the point $P_{mn}$ and the pixel presenting the point $P_{mn+1}$ generally have nearly equal pixel values. Therefore, with the above configuration, the pixels presenting the same point in different images can be presumed based on difference in the pixel value with high accuracy. A line passing through pixels presenting the same point (namely, the pixel presenting the point $P_{mn}$ and the pixel presenting the point $P_{mn+1}$) can be presumed with higher accuracy than the prior art.

In addition to the points $P_{mn}$ and $P_{mn+1}$, a point $P_{1hmn}$ projected from the point P on the object OJ on a sub-image $S_{mn}$ of an interpolated light field image $LF_{1h}$ (h=2 to H) is also present on the above epipolar plane. Furthermore, a microlens $L_{mn}$ of a lens array $LA_{1h}$ is presumably placed between the microlenses $L_{mn}$ and $L_{mn+1}$ of the lens array $LA_{11}$. Therefore, the point $P_{1hmn}$ is situated between the points $P_{mn}$ and $P_{mn+1}$ on the epipolar plane. Then, with this configuration, the pixel situated between the points $P_{mn}$ and $P_{mn+1}$ through which the presumed line passes is presumed to be a pixel presenting the point P. The pixel presenting the point P can be presumed with higher accuracy than the prior art.

Furthermore, with the above configuration, if the evaluation value Line (θ*) is lower than the predetermined threshold th in the step S50 of FIG. 14 (Step S50; No), it is determined that the line of an angle θ* passing through the pixel $E_{11ni}$ may not be the line passing through multiple pixels presenting the same point P on the object OJ, and information indicating that the presumed angle θ* is unknown is stored in the presumed angle S table of FIG. 15. Furthermore, if the presumed angle θ* is not acquired from the presumed angle S table in the Step 70 of FIG. 16B, the pixel value of a pixel presenting the same point P on the object OJ as the pixel $E_{11ni}$ (namely, the corresponding pixel) is not determined. Therefore, the light field image $LF_{1h}$ is interpolated with higher accuracy than the prior art and a reconstructed image with less noise can be created.

The embodiment describes that the image information acquisition part 211 and interpolation part 212 create interpolated light field images $LF_{12}$ to $LF_{1H}$ based on the captured light field image $LF_{11}$ in the processing of the Steps S02 to S07 of FIG. 4A and then set the value of the variable h to "1" and create interpolated light field images $LF_{21}$ to $LF_{I1}$ based on the light field images $LF_{11}$ in the processing of the Steps S10 to S16. Then, the embodiment describes that the interpolation part 212 sets the value of the variable h to "2" and the image information acquisition part 211 and interpolation part 212 repeat the processing of the Steps S10 to S16 to create interpolated light field images $LF_{ih}$ (i=2 to I and h=2 to H) based on the interpolated light field images $LF_{12}$ to $LF_{1H}$.

However, the present invention is not restricted to the above. The image information acquisition part 211 and interpolation part 212 may create interpolated light field images $LF_{12}$ to $LF_{1H}$ and $LF_{21}$ to $LF_{I1}$ and then repeat the processing of the Steps S02 to S07 to create interpolated light field images $LF_{ih}$ (i=2 to I and h=2 to H) based on the interpolated light field images $LF_{21}$ to $LF_{I1}$.

Furthermore, the interpolation part 212 may create interpolated light field images $LF_{12}$ to $LF_{1H}$ and $LF_{21}$ to $LF_{I1}$ and calculates the pixel values of pixels of an interpolated field image $LF_{ih}$ by dividing the sum of the pixel values of pixels of an interpolated light field image $LF_{ih}$ (h=2 to H) and the pixel values of pixels of an interpolated light field image $LF_{i1}$ (i=2 to I) by "2" so as to create an interpolated light field image $LF_{ih}$. For example, the interpolation part 212 calculates the pixel values of pixels of the interpolated field image $LF_{22}$ by dividing the sum of the pixel values of pixels of the interpolated light field image $LF_{12}$ and the pixel values of the corresponding pixels of the interpolated light field image $LF_{21}$ by "2". In another example, the interpolation part 212 calculates the pixel values of pixels of the interpolated field image $LF_{23}$ by dividing the sum of the pixel values of pixels of the interpolated light field image $LF_{13}$ and the pixel values of the corresponding pixels of the interpolated light field image $LF_{21}$ by "2".

<Modified Embodiment>

The above embodiment describes that the line presumption part 212c identifies a line presumed to be the corresponding pixel line among multiple lines passing through the pixel $E_{11nl}$ (n=1 to N and l=1 to L) of the light field image $LF_{11}$ constituting the interpolated epipolar image $CES_{mk}$ (m=1 to M and k=1 to K) as shown in FIG. 17. The above embodiment describes that the pixel value determination part 212e determines the pixel values $I_{1hna}$ and $I_{1hnb}$ of the pixels $E_{1hna}$ and $E_{1hnb}$ determined based on the intersection $CP_h$ between a line presumed to be the corresponding pixel line (namely, the presumed line) and the interpolated pixel line passing through the centers $C_{h1}$ to $C_{hL}$ based on the pixel value of the pixel $E_{11nl}$.

However, the line presumption part 212c may be configured to identify a line presumed to be the corresponding pixel line from multiple lines passing through the pixel $E_{1hnl}$ of the interpolated light field image $LF_{1h}$ constituting the interpolated epipolar image $CES_{mk}$ as shown in FIG. 21. In this configuration, the line presumption part 212c calculates the evaluation value Line (θ) of a line EPL of an angle θ passing through the pixel $E_{1hnl}$ using the formulae (8) and (9) below and identifies the optimum angle θ* minimizing the calculated evaluation value.

$$\text{Line}(\theta) = \frac{1}{Q} \sum_{q \in EPI} \{I_q - \text{Average}(\theta)\}^2 \quad (8)$$

$$\text{Average}(\theta) = \frac{1}{Q} \sum_{q \in EPI} I_q \quad (9)$$

in which EPI is a set of pixels on the line passing through the pixel $E_{1hnl}$, q is an element of the set, Q is the number of elements in the set, and $I_q$ is the pixel value of an element q.

Furthermore, the pixel value determination part 212e may employ the average pixel value Average (θ*) of the optimum angle θ* calculated using the above formula (9) as the pixel value $I_{1hnl}$ of the pixel $E_{1hnl}$. Furthermore, the reconstruction part 215 does not need to use the pixel value of a pixel through which the line specified by the optimum angle θ* passes for reconstruction of an image OB when the evaluation value Line (θ*) of the optimum angle θ* is lower than the threshold th.

In the above modified embodiment, the pixel value of the pixel $E_{1hnl}$ is determined based on the pixel value $I_q$ of a pixel on the presumed line passing through the pixel $E_{1hnl}$ of the interpolated light field image $LF_{1h}$. Therefore, the pixel value of the pixel $E_{1hnl}$ can be determined by a smaller amount of calculation than the above embodiment with high accuracy. Furthermore, when the evaluation value Line (θ*) of the optimum angle θ* is lower than the threshold th, the pixel value of a pixel through which the line specified by the optimum angle θ* passes is not used for reconstruction of an image OB. An image OB with less noise can be created.

The above embodiment and modified embodiment of the present invention can be combined with each other.

Need less to say, the image reconstructing device 210 in which the configuration for realizing the above embodiment or modified embodiment is incorporated in advance can be provided. In addition, an existing image reconstructing device can be made to function as the image reconstructing device 210 according to the above embodiment or modified embodiment by applying programs. In other words, application of programs for realizing the functional configuration of the image reconstructing device 210 exemplified in the above embodiment or modified embodiment to allow a computer (CPU or the like) controlling an existing image reconstructing device to execute them, leads to the existing image reconstructing device functioning as the image reconstructing device 210 according to the above embodiment or modified embodiment.

Such programs can be distributed in any fashion. For example, the programs can be stored and distributed on a recording medium such as a memory card, CD-ROM, and DVD-ROM, or distributed via a communication medium such as the Internet.

Various embodiments and modifications are available to the present invention without departing from the broad sense of spirit and scope of the present invention. In other words, several embodiments of the present invention are given. However, the above embodiments are given for explaining the present invention and do not confine the scope of the present invention. The scope of the present invention includes the invention set forth in the scope of claims, not in the embodiment, and its equivalent scope.

What is claimed is:

1. An image reconstructing device comprising:
   an image information acquiring section that acquires information forming a lens array image, the lens array image being formed by a lens array comprising an array of sub-lenses including a first sub-lens and a second sub-lens, for an optical image of an object formed by a main lens;
   an interpolating section that interpolates a third sub-image formed by a third sub-lens based on a first sub-image and a second sub-image constituting the lens array image, wherein the third sub-lens is an imaginary sub-lens positioned between the first sub-lens forming the first sub-image and the second sub-lens forming the second sub-image;
   a distance information acquiring section that acquires distance information indicating a distance to a point on which the main lens focuses;

a reconstructing section that reconstructs an image of the object formed by the main lens focused on the point at the distance indicated by the acquired distance information from the interpolated third sub-image, the first sub-image, and the second sub-image; and an image information outputting section that outputs information forming the reconstructed image, wherein the interpolating section identifies a parallax between the first sub-image and the second sub-image based on a pixel value of the first sub-image and a pixel value of the second sub-image, and interpolates the third sub-image so that a ratio of a parallax between the first sub-image and the third sub-image to the identified parallax is equal to a ratio of a distance between the first sub-lens and the third sub-lens to a distance between the first sub-lens and the second sub-lens.

2. An image reconstructing device comprising:

an image information acquiring section that acquires information forming a lens array image, the lens array image being formed by a lens array comprising an array of sub-lenses including a first sub-lens and a second sub-lens, for an optical image of an object formed by a main lens;

an interpolating section that interpolates a third sub-image formed by a third sub-lens based on a first sub-image and a second sub-image constituting the lens array image, wherein the third sub-lens is an imaginary sub-lens positioned between the first sub-lens forming the first sub-image and the second sub-lens forming the second sub-image;

a distance information acquiring section that acquires distance information indicating a distance to a point on which the main lens focuses;

a reconstructing section that reconstructs an image of the object formed by the main lens focused on the point at the distance indicated by the acquired distance information from the interpolated third sub-image, the first sub-image, and the second sub-image; and an image information outputting section that outputs information forming the reconstructed image, wherein the interpolating section comprises:

an extracting section that extracts a first pixel line and a second pixel line on a same epipolar plane from the first sub-image and the second sub-image indicated by the acquired information;

a creating section that creates an epipolar image in which the extracted first pixel line, a third pixel line on the epipolar plane in the third sub-image, and the extracted second pixel line are arranged in sequence in a direction of a normal line to the epipolar plane;

a line presuming section that presumes, among lines passing through a first pixel on the first pixel line constituting the epipolar image, a line passing through a second pixel indicating the same point on the object as indicated by the first pixel among pixels constituting the second pixel line based on a difference between a pixel value of the first pixel and a pixel value of the second pixel;

a pixel presuming section that presumes a pixel through which the presumed line passes among pixels constituting the third pixel line to be a pixel indicating the same point on the object as indicated by the first pixel and the second pixel; and a pixel value determining section that determines a pixel value of the presumed pixel based on the pixel value of the first pixel.

3. The image reconstructing device according claim 2, wherein:

the line presuming section presumes that the line passing through the first pixel and the second pixel may not be a line passing through pixels indicating the same point on the object when the difference between the pixel value of the first pixel and the pixel value of the second pixel is smaller than a given threshold;

the pixel value determining section does not determine the pixel value of the pixel constituting the third pixel line based on the pixel value of the first pixel and the pixel value of the second pixel through which the line passes when the line that is presumably not the line passing through pixels indicating the same point on the object passes through the pixel constituting the third pixel line; and the pixel value determining section determines the pixel value of the pixel constituting the third pixel line based on the pixel value of the pixel on the first pixel line and the pixel value of the pixel on the second pixel line through which the line passes when the line that is presumably the line passing through pixels indicating the same point on the object passes through the pixel constituting the third pixel line.

4. The image reconstructing device according to claim 3, wherein:

the reconstructing section does not use a pixel value of a pixel through which the line that is presumably not the line passing through pixels indicating the same point on the object passes among pixels constituting the third pixel line for reconstructing the image of the object.

5. An image reconstructing device comprising:

an image information acquiring section that acquires information forming a lens array image, the lens array image being formed by a lens array comprising an array of sub-lenses including a first sub-lens and a second sub-lens, for an optical image of an object formed by a main lens;

an interpolating section that interpolates a third sub-image formed by a third sub-lens based on a first sub-image and a second sub-image constituting the lens array image, wherein the third sub-lens is an imaginary sub-lens positioned between the first sub-lens forming the first sub-image and the second sub-lens forming the second sub-image;

a distance information acquiring section that acquires distance information indicating a distance to a point on which the main lens focuses;

a reconstructing section that reconstructs an image of the object formed by the main lens focused on the point at the distance indicated by the acquired distance information from the interpolated third sub-image, the first sub-image, and the second sub-image; and an image information outputting section that outputs information forming the reconstructed image, wherein the interpolating section comprises:

an extracting section that extracts a first pixel line and a second pixel line on a same epipolar plane from the first sub-image and the second sub-image indicated by the acquired information;

a creating section that creates an epipolar image in which the extracted first pixel line, a third pixel line on the epipolar plane in the third sub-image, and the extracted second pixel line are arranged in sequence in a direction of a normal line to the epipolar plane;

a line presuming section that presumes a line passing through a first pixel on the first pixel line and a second pixel on the second pixel line indicating the same point on the object among lines passing through a given pixel on the third pixel line constituting the epipolar image based on a difference between a pixel value of the first pixel and a pixel value of the second pixel; and a pixel value determining section that determines a pixel value of the given pixel based on the pixel value of the first pixel and the pixel value of the second pixel through which the presumed line passes.

6. An image reconstructing method, comprising:

acquiring information forming a lens array image, the lens array image being formed by a lens array comprising an array of sub-lenses including a first sub-lens and a second sub-lens, for an optical image of an object formed by a main lens;

interpolating a third sub-image formed by a third sub-lens based on a first sub-image and a second sub-image constituting the lens array image, wherein the third sub-lens is an imaginary sub-lens positioned between the first sub-lens forming the first sub-image and the second sub-lens forming the second sub-image;

acquiring distance information indicating a distance to a point on which the main lens focuses;

reconstructing an image of the object formed by the main lens focused on the point at the distance indicated by the acquired distance information from the interpolated third sub-image, the first sub-image, and the second sub-image; and outputting information forming the reconstructed image, wherein the interpolating comprises identifying a parallax between the first sub-image and the second sub-image based on a pixel value of the first sub-image and a pixel value of the second sub-image, and interpolating the third sub-image so that a ratio of a parallax between the first sub-image and the third sub-image to the identified parallax is equal to a ratio of a distance between the first sub-lens and the third sub-lens to a distance between the first sub-lens and the second sub-lens.

7. An image reconstructing method, comprising:

acquiring information forming a lens array image, the lens array image being formed by a lens array comprising an array of sub-lenses including a first sub-lens and a second sub-lens, for an optical image of an object formed by a main lens;

interpolating a third sub-image formed by a third sub-lens based on a first sub-image and a second sub-image constituting the lens array image, wherein the third sub-lens is an imaginary sub-lens positioned between the first sub-lens forming the first sub-image and the second sub-lens forming the second sub-image;

acquiring distance information indicating a distance to a point on which the main lens focuses;

reconstructing an image of the object formed by the main lens focused on the point at the distance indicated by the acquired distance information from the interpolated third sub-image, the first sub-image, and the second sub-image; and outputting information forming the reconstructed image, wherein the interpolating comprises:

extracting a first pixel line and a second pixel line on a same epipolar plane from the first sub-image and the second sub-image indicated by the acquired information;

creating an epipolar image in which the extracted first pixel line, a third pixel line on the epipolar plane in the third sub-image, and the extracted second pixel line are arranged in sequence in a direction of a normal line to the epipolar plane;

presuming, among lines passing through a first pixel on the first pixel line constituting the epipolar image, a line passing through a second pixel indicating the same point on the object as indicated by the first pixel among pixels constituting the second pixel line based on a difference between a pixel value of the first pixel and a pixel value of the second pixel;

presuming a pixel through which the presumed line passes among pixels constituting the third pixel line to be a pixel indicating the same point on the object as indicated by the first pixel and the second pixel; and determining a pixel value of the presumed pixel based on the pixel value of the first pixel.

8. An image reconstructing method, comprising:

acquiring information forming a lens array image, the lens array image being formed by a lens array comprising an array of sub-lenses including a first sub-lens and a second sub-lens, for an optical image of an object formed by a main lens;

interpolating a third sub-image formed by a third sub-lens based on a first sub-image and a second sub-image constituting the lens array image, wherein the third sub-lens is an imaginary sub-lens positioned between the first sub-lens forming the first sub-image and the second sub-lens forming the second sub-image;

acquiring distance information indicating a distance to a point on which the main lens focuses;

reconstructing an image of the object formed by the main lens focused on the point at the distance indicated by the acquired distance information from the interpolated third sub-image, the first sub-image, and the second sub-image; and outputting information forming the reconstructed image, wherein the interpolating comprises:

extracting a first pixel line and a second pixel line on a same epipolar plane from the first sub-image and the second sub-image indicated by the acquired information;

creating an epipolar image in which the extracted first pixel line, a third pixel line on the epipolar plane in the third sub-image, and the extracted second pixel line are arranged in sequence in a direction of a normal line to the epipolar plane;

presuming a line passing through a first pixel on the first pixel line and a second pixel on the second pixel line indicating the same point on the object among lines passing through a given pixel on the third pixel line constituting the epipolar image based on a difference between a pixel value of the first pixel and a pixel value of the second pixel; and determining a pixel value of the given pixel based on the pixel value of the first pixel and the pixel value of the second pixel through which the presumed line passes.

9. A non-transitory computer readable storage medium having stored thereon a program that is executable by a computer to cause the computer to perform functions comprising:

acquiring information forming a lens array image, the lens array image being formed by a lens array comprising an array of sub-lenses including a first sub-lens and a second sub-lens, for an optical image of an object formed by a main lens;

interpolating a third sub-image formed by a third sub-lens based on a first sub-image and a second sub-image constituting the lens array image, wherein the third sub-lens is an imaginary sub-lens positioned between the first sub-lens forming the first sub-image and the second sub-lens forming the second sub-image;

acquiring distance information indicating a distance to a point on which the main lens focuses;

reconstructing an image of the object formed by the main lens focused on the point at the distance indicated by the acquired distance information from the interpolated third sub-image, the first sub-image, and the second sub-image; and outputting information forming the reconstructed image, wherein the interpolating comprises identifying a parallax between the first sub-image and the second sub-image based on a pixel value of the first sub-image and a pixel value of the second sub-image, and interpolating the third sub-image so that a ratio of a parallax between the first sub-image and the third sub-image to the identified parallax is equal to a ratio of a distance between the first sub-lens and the third sub-lens to a distance between the first sub-lens and the second sub-lens.

10. A non-transitory computer readable storage medium having stored thereon a program that is executable by a computer to cause the computer to perform functions comprising:

acquiring information forming a lens array image, the lens array image being formed by a lens array comprising an array of sub-lenses including a first sub-lens and a second sub-lens, for an optical image of an object formed by a main lens;

interpolating a third sub-image formed by a third sub-lens based on a first sub-image and a second sub-image constituting the lens array image, wherein the third sub-lens is an imaginary sub-lens positioned between the first sub-lens forming the first sub-image and the second sub-lens forming the second sub-image;

acquiring distance information indicating a distance to a point on which the main lens focuses;

reconstructing an image of the object formed by the main lens focused on the point at the distance indicated by the acquired distance information from the interpolated third sub-image, the first sub-image, and the second sub-image; and outputting information forming the reconstructed image, wherein the interpolating comprises:

extracting a first pixel line and a second pixel line on a same epipolar plane from the first sub-image and the second sub-image indicated by the acquired information;

creating an epipolar image in which the extracted first pixel line, a third pixel line on the epipolar plane in the third sub-image, and the extracted second pixel line are arranged in sequence in a direction of a normal line to the epipolar plane;

presuming, among lines passing through a first pixel on the first pixel line constituting the epipolar image, a line passing through a second pixel indicating the same point on the object as indicated by the first pixel among pixels constituting the second pixel line based on a difference between a pixel value of the first pixel and a pixel value of the second pixel;

presuming a pixel through which the presumed line passes among pixels constituting the third pixel line to be a pixel indicating the same point on the object as indicated by the first pixel and the second pixel; and determining a pixel value of the presumed pixel based on the pixel value of the first pixel.

11. A non-transitory computer readable storage medium having stored thereon a program that is executable by a computer to cause the computer to perform functions comprising:

acquiring information forming a lens array image, the lens array image being formed by a lens array comprising an array of sub-lenses including a first sub-lens and a second sub-lens, for an optical image of an object formed by a main lens;

interpolating a third sub-image formed by a third sub-lens based on a first sub-image and a second sub-image constituting the lens array image, wherein the third sub-lens is an imaginary sub-lens positioned between the first sub-lens forming the first sub-image and the second sub-lens forming the second sub-image;

acquiring distance information indicating a distance to a point on which the main lens focuses;

reconstructing an image of the object formed by the main lens focused on the point at the distance indicated by the acquired distance information from the interpolated third sub-image, the first sub-image, and the second sub-image; and outputting information forming the reconstructed image, wherein the interpolating comprises:

extracting a first pixel line and a second pixel line on a same epipolar plane from the first sub-image and the second sub-image indicated by the acquired information;

creating an epipolar image in which the extracted first pixel line, a third pixel line on the epipolar plane in the third sub-image, and the extracted second pixel line are arranged in sequence in a direction of a normal line to the epipolar plane;

presuming a line passing through a first pixel on the first pixel line and a second pixel on the second pixel line indicating the same point on the object among lines passing through a given pixel on the third pixel line constituting the epipolar image based on a difference between a pixel value of the first pixel and a pixel value of the second pixel; and determining a pixel value of the given pixel based on the pixel value of the first pixel and the pixel value of the second pixel through which the presumed line passes.

* * * * *